United States Patent
Zheng et al.

(10) Patent No.: US 9,729,470 B2
(45) Date of Patent: Aug. 8, 2017

(54) METHOD, APPARATUS, AND SYSTEM FOR IMPLEMENTING NODE PORT VIRTUALIZATION ON FIBRE CHANNEL

(71) Applicant: Huawei Technologies Co., Ltd., Shenzhen (CN)

(72) Inventors: Ming Zheng, Nanjing (CN); Xingfeng Jiang, Nanjing (CN); Wei Song, Nanjing (CN); Yongjun Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 14/827,006

(22) Filed: Aug. 14, 2015

(65) Prior Publication Data

US 2015/0358254 A1     Dec. 10, 2015

Related U.S. Application Data

(63) Continuation of application No. PCT/CN2013/071632, filed on Feb. 18, 2013.

(51) Int. Cl.
*H04L 1/00* (2006.01)
*H04L 12/937* (2013.01)
(Continued)

(52) U.S. Cl.
CPC ............ *H04L 49/253* (2013.01); *G06F 3/067* (2013.01); *H04L 49/357* (2013.01);
(Continued)

(58) Field of Classification Search
CPC ............ H04L 41/0654; H04L 41/0659; H04L 41/0663; H04L 41/0668; H04L 41/0672;
(Continued)

(56) References Cited

U.S. PATENT DOCUMENTS

| 8,351,442 B1 | 1/2013 | McGlaughlin |
| 2005/0198523 A1 | 9/2005 | Shanbhag et al. |

(Continued)

FOREIGN PATENT DOCUMENTS

| CN | 1943173 A | 4/2007 |
| CN | 101213818 A | 7/2008 |

(Continued)

OTHER PUBLICATIONS

Foreign Communication From A Counterpart Application, Japanese Application No. 2015-557308, Japanese Notice of Allowance dated Oct. 25, 2016, 3 pages.

(Continued)

*Primary Examiner* — Dady Chery
(74) *Attorney, Agent, or Firm* — Conley Rose, P.C.

(57) ABSTRACT

A method, apparatus, and system for implementing node port virtualization on a fiber channel in the field of communication technologies are provided. Multiple different virtual Node Port (N_port) identifications (IDs) are allocated to each of multiple N_ports, of an N_port virtualization (NPV) switch, corresponding to an N_port ID of a remote node. Because a virtual N_port ID is allocated, to each remote node, for more than one N_port of the NPV switch, regardless of which N_port of these N_ports a node connected to the NPV switch is registered for, the node can obtain the virtual N_port ID that is of each remote node and that is corresponding to the N_port. Therefore, any node connected to the NPV switch can communicate with any remote node, thereby improving communication efficiency.

16 Claims, 4 Drawing Sheets

(51) Int. Cl.
*H04L 29/12* (2006.01)
*H04L 29/08* (2006.01)
*G06F 3/06* (2006.01)
*H04L 12/931* (2013.01)

(52) U.S. Cl.
CPC ...... *H04L 61/1541* (2013.01); *H04L 67/1097* (2013.01); *H04L 61/2038* (2013.01); *H04L 61/2596* (2013.01); *H04L 61/6045* (2013.01)

(58) Field of Classification Search
CPC ......... H04L 45/22; H04L 45/28; H04B 10/03; H04B 10/032; H04B 10/035; H04B 10/038; H04J 14/0287; H04J 14/0289; H04J 14/029; H04J 14/0291
USPC ........ 370/216, 221, 229, 230, 235, 259, 401
See application file for complete search history.

(56) References Cited

U.S. PATENT DOCUMENTS

| | | |
|---|---|---|
| 2006/0159081 A1 | 7/2006 | Dropps |
| 2007/0005820 A1 | 1/2007 | Banzhaf et al. |
| 2007/0147267 A1 | 6/2007 | Holland |
| 2008/0219249 A1 | 9/2008 | McGlaughlin |
| 2009/0161692 A1 | 6/2009 | Hirata et al. |
| 2009/0219827 A1* | 9/2009 | Chen ................ H04L 49/357 370/252 |
| 2010/0017497 A1 | 1/2010 | Brown et al. |
| 2010/0030923 A1 | 2/2010 | Frazier et al. |
| 2011/0188511 A1 | 8/2011 | Di Benedetto |
| 2011/0200041 A1 | 8/2011 | Smith et al. |
| 2011/0228670 A1* | 9/2011 | Sasso ................ H04L 41/0668 370/221 |
| 2012/0254554 A1 | 10/2012 | Nakajima |

FOREIGN PATENT DOCUMENTS

| | | |
|---|---|---|
| CN | 102427410 A | 4/2012 |
| CN | 102742228 A | 10/2012 |
| CN | 102835077 A | 12/2012 |
| CN | 102883235 A | 1/2013 |
| JP | 20070179529 A | 7/2007 |
| JP | 2011508523 A | 3/2011 |
| JP | 2011528205 A | 11/2011 |
| WO | 2011119200 A1 | 9/2011 |

OTHER PUBLICATIONS

Foreign Communication From A Counterpart Application, Chinese Application No. 201380000091.2, Chinese Search Report dated Nov. 21, 2016, 2 pages.
Foreign Communication From A Counterpart Application, Chinese Application No. 201380000091.2, Chinese Office Action dated Dec. 1, 2016, 7 pages.
Foreign Communication From A Counterpart Application, PCT Application No. PCT/CN2013/071632, English of International Search Report dated Nov. 28, 2013, 2 pages.
Foreign Communication From A Counterpart Application, PCT Application No. PCT/CN2013/071632, English of Written Opinion dated Nov. 28, 2013, 6 pages.
Foreign Communication From A Counterpart Application, European Application No. 13875283.7, Extended European Search Report dated Feb. 3, 2016, 11 pages.

* cited by examiner

METHOD, APPARATUS, AND SYSTEM FOR IMPLEMENTING NODE PORT VIRTUALIZATION ON FIBRE CHANNEL

CROSS-REFERENCE TO RELATED APPLICATIONS

This application is a continuation of International Application No. PCT/CN2013/071632, filed on Feb. 18, 2013, which is hereby incorporated by reference in its entirety.

TECHNICAL FIELD

This application relates to the field of communications technologies, and in particular, to a method, apparatus, and system for implementing node port virtualization on a fibre channel.

BACKGROUND

A storage area network (SAN) is primarily used to enable a storage device, for example, a disk array, a tape library, and an optical jukebox, accessible to a server, so that the storage device functions like a device that is locally attached to an operating system.

Fibre Channel (FC) was primarily used in the supercomputer field, but has become a standard connection type for a storage area network in enterprise storage. A fibre channel host bus adapter (HBA) is located on a server or a storage device and provides a fibre channel port. Each HBA has a unique world wide name (WWN), which is similar to a media access control (MAC) address in an Ethernet. However, a WWN is longer. There are two types of WWNs on an HBA: a node WWN: a world wide node name (WWNN), which may be shared by some or all ports of a device; and a port WWN: a world wide port name (WWPN), which is unique to each port.

The following types of ports are defined by Fibre Channel: an N_port, that is, an N port, which is a port that is on a node (for example, a host, a server, or a storage device) and that is connected to an FC switched fabric (FC-SW or fabric), and is also referred to as a node port; an F_port, that is, an F port, which is a port on a fibre channel switch that is connected to a node (that is, connected to the N_port), and is also referred to as a fabric port; and an E_port, that is, an E port, which is a connection between two fibre channel switches, and is also referred to as an expansion port.

Node port virtualization (also referred to as N_port virtualization) reduces a quantity of fibre channel domain identifiers (FC domain identifier (ID)) in an SAN. One or more unique domain IDs are specified for each switch in a switched fabric. Usually, a quantity of domain IDs is a quantity of switches in the switched fabric. A switch operating in the node port virtualization (NPV) mode, hereinafter referred to as a node port virtualization switch or an NPV switch for short, does not join a switched fabric that is accessed by the switch, but the switch joins another switched fabric. The NPV switch simulates a port, connected to the switched fabric that is accessed by the NPV switch, as an N_port, and uses an N_port of a node of a switched fabric in which the NPV switch is located as a virtual N_port (VN_port) of the simulated N_port.

In a situation in which an NPV switch is connected to a fibre channel switched fabric by using two or more N ports, for example, in a scenario in which the NPV switch accesses another switched fabric in a load-sharing manner, a node connected to the NPV switch can only be virtualized as a VN_port on one of the N ports. Nodes that are virtualized as VN_ports on different N ports of a same NPV switch cannot communicate with a same remote node at the same time. The remote node refers to a node connected to the switched fabric that is accessed by the NPV switch.

SUMMARY

Embodiments of the present disclosure provides a method, apparatus, and system for implementing node port virtualization on a fibre channel, so as to resolve a problem that a node port virtualization technology has low communication efficiency.

According to a first aspect, an embodiments of the present disclosure provides a method for implementing node port virtualization on a fibre channel, where a node port virtualization switch is connected to a fibre channel switched fabric by using at least two N ports, and the method includes receiving, by the node port virtualization switch, a first registered state change notification by using an N port of the at least two N ports, where the first registered state change notification carries a first N port identifier, allocating, by the node port virtualization switch to the at least two N ports connected to the fibre channel switched fabric, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports connected to the fibre channel switched fabric, and sending, by the node port virtualization switch, a second registered state change notification by using an F port of the node port virtualization switch, where the second registered state change notification carries one of the at least two second N port identifiers.

In a first implementation manner of the first aspect, the method further includes receiving, by the node port virtualization switch, a fibre channel packet by using the F port of the node port virtualization switch, where a destination fibre channel identifier of the fibre channel packet is the second N port identifier, replacing, by the node port virtualization switch, the destination fibre channel identifier of the fibre channel packet with the first N port identifier corresponding to the second N port identifier, and sending, by the node port virtualization switch, the replaced fibre channel packet by using an N port corresponding to the second N port identifier.

With reference to the first aspect or the first implementation manner of the first aspect, in a second implementation manner of the first aspect, the method further includes receiving, by the node port virtualization switch, a fibre channel packet by using one N port of the at least two N ports, where a source fibre channel identifier of the fibre channel packet is the first N port identifier, replacing, by the node port virtualization switch, the source fibre channel identifier of the fibre channel packet with a second N port identifier that is of the at least two second N port identifiers corresponding to the first N port identifier and that is corresponding to the N port that receives the fibre channel packet, and sending, by the node port virtualization switch, the replaced fibre channel packet.

With reference to any one of the first aspect, the first implementation manner and the second implementation manner of the first aspect, in a third implementation manner of the first aspect, before the receiving, by the node port virtualization switch, a first registered state change notification by using any one of the at least two N ports, the method further includes receiving, by the node port virtualization switch, a first fabric login request by using the F port of the node port virtualization switch, where the first fabric login request includes a first world wide port name; or receiving, by the node port virtualization switch, a first fabric discovery request by using the F port of the node port virtualization switch, where the first fabric discovery request includes a first world wide port name, sending, by the node port virtualization switch, a second fabric discovery request by using one N port of the at least two N ports connected to the fibre channel switched fabric, where the second fabric discovery request includes the first world wide port name, and receiving, by the node port virtualization switch, a second fabric discovery response by using the N port that sends the second fabric discovery request, where the second fabric discovery response includes a third N port identifier corresponding to the first world wide port name.

According to a second aspect, an embodiments of the present disclosure provides an apparatus for implementing node port virtualization on a fibre channel, which is implemented by a node port virtualization switch, where the node port virtualization switch is connected to a fibre channel switched fabric by using at least two N ports, and the apparatus includes a receiving module, an allocation module, and a sending module, where the receiving module is configured to receive a first registered state change notification by using an N port of the at least two N ports, where the first registered state change notification carries a first N port identifier, the allocation module is configured to allocate, to the at least two N ports connected to the fibre channel switched fabric, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports connected to the fibre channel switched fabric, and the sending module is configured to send a second registered state change notification by using an F port of the node port virtualization switch, where the second registered state change notification carries one of the at least two second N port identifiers.

In a first implementation manner of the second aspect, the receiving module is further configured to receive a fibre channel packet by using the F port of the node port virtualization switch, where a destination fibre channel identifier of the fibre channel packet is the second N port identifier, and the sending module is further configured to replace the destination fibre channel identifier of the fibre channel packet with the first N port identifier corresponding to the second N port identifier, and send the replaced fibre channel packet by using an N port corresponding to the second N port identifier.

With reference to the second aspect or the first implementation manner of the second aspect, in a second implementation manner of the second aspect, the receiving module is further configured to receive a fibre channel packet by using one N port of the at least two N ports, where a source fibre channel identifier of the fibre channel packet is the first N port identifier, and the sending module is further configured to replace the source fibre channel identifier of the fibre channel packet with a second N port identifier that is of the at least two second N port identifiers corresponding to the first N port identifier and that is corresponding to the N port that receives the fibre channel packet, and send the replaced fibre channel packet.

With reference to any one of the second aspect, the first implementation manner and the second implementation manner of the second aspect, in a third implementation manner of the second aspect, the apparatus further includes a first virtual module, where the first virtual module is configured to receive a first fabric login request by using the F port of the node port virtualization switch, where the first fabric login request includes a first world wide port name; send a second fabric discovery request by using one N port of the at least two N ports connected to the fibre channel switched fabric, where the second fabric discovery request includes the first world wide port name; and receive a second fabric discovery response by using the N port that sends the second fabric discovery request, where the second fabric discovery response includes a third N port identifier corresponding to the first world wide port name.

With reference to the second aspect or any one of the first implementation manner to the third implementation manner of the second aspect, in a fourth implementation manner of the second aspect, the apparatus further includes a second virtual module, where the second virtual module is configured to receive a first fabric discovery request by using the F port of the node port virtualization switch, where the first fabric discovery request includes the first world wide port name; send a second fabric discovery request by using one N port of the at least two N ports connected to the fibre channel switched fabric, where the second fabric discovery request includes the first world wide port name; and receive a second fabric discovery response by using the N port that sends the second fabric discovery request, where the second fabric discovery response includes a third N port identifier corresponding to the first world wide port name.

According to a third aspect, an embodiments of the present disclosure provides a node port virtualization switch, where the node port virtualization switch includes at least two N ports, an F port, a processor, and a memory; the at least two N ports are connected to a fibre channel switched fabric, the at least two N ports are connected to the processor, the F port is connected to the processor, and the memory is connected to the processor; and the processor executes the following steps according to a program instruction stored by the memory receiving a first registered state change notification by using an N port of the at least two N ports, where the first registered state change notification carries a first N port identifier, allocating, to the at least two N ports, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports connected to the fibre channel switched fabric, and sending a second registered state change notification by using the F port, where the second registered state change notification carries one of the at least two second N port identifiers.

In a first implementation manner of the third aspect, the node port virtualization switch further includes a forwarder, where the forwarder receives a fibre channel packet by using the F port of the node port virtualization switch, where a destination fibre channel identifier of the fibre channel packet is the second N port identifier, the forwarder replaces the destination fibre channel identifier of the fibre channel packet with the first N port identifier corresponding to the second N port identifier, and the forwarder sends the replaced fibre channel packet by using an N port corresponding to the second N port identifier.

With reference to the third aspect or the first implementation manner of the third aspect, in a second implementation manner of the third aspect, the node port virtualization switch further includes the forwarder, where the forwarder receives a fibre channel packet by using one N port of the at least two N ports, where a source fibre channel identifier of the fibre channel packet is the first N port identifier, the forwarder replaces the source fibre channel identifier of the fibre channel packet with a second N port identifier that is of the at least two second N port identifiers corresponding to the first N port identifier and that is corresponding to the N port that receives the fibre channel packet, and the forwarder sends the replaced fibre channel packet.

With reference to any one of the third aspect, the first implementation manner and the second implementation manner of the third aspect, in a third implementation manner of the third aspect, before executing, according to the program instruction stored by the memory, the step of the receiving, by the node port virtualization switch, a first registered state change notification by using any one of the at least two N ports, the processor further executes the following steps receiving a first fabric login request by using the F port, where the first fabric login request includes a first world wide port name; or receiving a first fabric discovery request by using the F port, where the first fabric discovery request includes a first world wide port name, sending a second fabric discovery request by using one N port of the at least two N ports connected to the fibre channel switched fabric, where the second fabric discovery request includes the first world wide port name, and receiving a second fabric discovery response by using the N port that sends the second fabric discovery request, where the second fabric discovery response includes a third N port identifier corresponding to the first world wide port name.

According to a fourth aspect, an embodiments of the present disclosure provides a system for implementing node port virtualization on a fibre channel, including a node port virtualization switch, where the node port virtualization switch is connected to a fibre channel switched fabric by using at least two N ports, and the node port virtualization switch is configured to receive a first registered state change notification by using an N port of the at least two N ports, where the first registered state change notification carries a first N port identifier; allocate, to the at least two N ports connected to the fibre channel switched fabric, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports connected to the fibre channel switched fabric; and send a second registered state change notification by using an F port of the node port virtualization switch, where the second registered state change notification carries one of the at least two second N port identifiers.

In a first implementation manner of the fourth aspect, the node port virtualization switch is further configured to receive a fibre channel packet by using the F port of the node port virtualization switch, where a destination fibre channel identifier of the fibre channel packet is the second N port identifier; replace the destination fibre channel identifier of the fibre channel packet with the first N port identifier corresponding to the second N port identifier; and send the replaced fibre channel packet by using an N port corresponding to the second N port identifier.

With reference to the fourth aspect or the first implementation manner of the fourth aspect, in a second implementation manner of the fourth aspect, the node port virtualization switch is further configured to receive a fibre channel packet by using one N port of the at least two N ports, where a source fibre channel identifier of the fibre channel packet is the first N port identifier; replace the source fibre channel identifier of the fibre channel packet with a second N port identifier that is of the at least two second N port identifiers corresponding to the first N port identifier and that is corresponding to the N port that receives the fibre channel packet; and send the replaced fibre channel packet.

With reference to any one of the fourth aspect, the first implementation manner and the second implementation manner of the fourth aspect, in a third implementation manner of the fourth aspect, the node port virtualization switch is further configured to: before receiving the first registered state change notification by using any one of the at least two N ports, receive a first fabric login request by using the F port of the node port virtualization switch, where the first fabric login request includes a first world wide port name; or receive a first fabric discovery request by using the F port of the node port virtualization switch, where the first fabric discovery request includes a first world wide port name; send a second fabric discovery request by using one N port of the at least two N ports connected to the fibre channel switched fabric, where the second fabric discovery request includes the first world wide port name; and receive a second fabric discovery response by using the N port that sends the second fabric discovery request, where the second fabric discovery response includes a third N port identifier corresponding to the first world wide port name.

With reference to the fourth aspect or any one of the first implementation manner to the third implementation manner of the fourth aspect, in a fourth implementation manner of the fourth aspect, the system further includes a fibre channel switch, and the fibre channel switch is located in the fibre channel switched fabric.

With reference to the fourth aspect or any one of the first implementation manner to the fourth implementation manner of the fourth aspect, in a fifth implementation manner of the fourth aspect, the system further includes a node, and the node is connected to the node port virtualization switch.

According to a fifth aspect, an embodiments of the present disclosure provides a method for implementing node port virtualization on a fibre channel, where a node port virtualization switch is connected to a fibre channel switched fabric by using at least two N ports, and the method includes receiving, by the node port virtualization switch, multiple first registered state change notifications by using multiple N ports of the at least two N ports, where the multiple first registered state change notifications carry a same first N port identifier, allocating, by the node port virtualization switch to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications, and sending, by the node port virtualization switch, a second registered state change notification by using an F port of the node port virtualization switch, where the second registered state change notification carries one of the multiple second N port identifiers.

In a first implementation manner of the fifth aspect, the method further includes receiving, by the node port virtualization switch, a fibre channel packet by using the F port of the node port virtualization switch, where a destination fibre channel identifier of the fibre channel packet is the second N port identifier, replacing, by the node port virtualization switch, the destination fibre channel identifier of the fibre channel packet with the first N port identifier corresponding to the second N port identifier, and sending, by the node port virtualization switch, the replaced fibre channel packet by using an N port corresponding to the second N port identifier.

With reference to the fifth aspect or the first implementation manner of the fifth aspect, in a second implementation manner of the fifth aspect, the method further includes receiving, by the node port virtualization switch, a fibre channel packet by using one N port of the at least two N ports, where a source fibre channel identifier of the fibre channel packet is the first N port identifier, replacing, by the node port virtualization switch, the source fibre channel identifier of the fibre channel packet with a second N port identifier that is of the multiple second N port identifiers corresponding to the first N port identifier and that is corresponding to the N port that receives the fibre channel packet, and sending, by the node port virtualization switch, the replaced fibre channel packet.

With reference to any one of the fifth aspect, the first implementation manner and the second implementation manner of the fifth aspect, in a third implementation manner of the fifth aspect, before the receiving, by the node port virtualization switch, a first registered state change notification by using any one of the at least two N ports, the method further includes receiving, by the node port virtualization switch, a first fabric login request by using the F port of the node port virtualization switch, where the first fabric login request includes a first world wide port name; or receiving, by the node port virtualization switch, a first fabric discovery request by using the F port of the node port virtualization switch, where the first fabric discovery request includes a first world wide port name, sending, by the node port virtualization switch, a second fabric discovery request by using one N port of the at least two N ports connected to the fibre channel switched fabric, where the second fabric discovery request includes the first world wide port name, and receiving, by the node port virtualization switch, a second fabric discovery response by using the N port that sends the second fabric discovery request, where the second fabric discovery response includes a third N port identifier corresponding to the first world wide port name.

According to a sixth aspect, an embodiments of the present disclosure provides an apparatus for implementing node port virtualization on a fibre channel, which is implemented by a node port virtualization switch, where the node port virtualization switch is connected to a fibre channel switched fabric by using at least two N ports, and the apparatus includes a receiving module, an allocation module, and a sending module, where the receiving module is configured to receive multiple first registered state change notifications by using multiple N ports of the at least two N ports, where the multiple first registered state change notifications carry a same first N port identifier, the allocation module is configured to allocate, to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications, and the sending module is configured to send a second registered state change notification by using an F port of the node port virtualization switch, where the second registered state change notification carries one of the multiple second N port identifiers.

In a first implementation manner of the sixth aspect, the receiving module is further configured to receive a fibre channel packet by using the F port of the node port virtualization switch, where a destination fibre channel identifier of the fibre channel packet is the second N port identifier, and the sending module is further configured to replace the destination fibre channel identifier of the fibre channel packet with the first N port identifier corresponding to the second N port identifier, and send the replaced fibre channel packet by using an N port corresponding to the second N port identifier.

With reference to the sixth aspect or the first implementation manner of the sixth aspect, in a second implementation manner of the sixth aspect, the receiving module is further configured to receive a fibre channel packet by using one N port of the at least two N ports, where a source fibre channel identifier of the fibre channel packet is the first N port identifier, and the sending module is further configured to replace the source fibre channel identifier of the fibre channel packet with a second N port identifier that is of the multiple second N port identifiers corresponding to the first N port identifier and that is corresponding to the N port that receives the fibre channel packet, and send the replaced fibre channel packet.

With reference to any one of the sixth aspect, the first implementation manner and the second implementation manner of the sixth aspect, in a third implementation manner of the sixth aspect, the apparatus further includes a first virtual module, where the first virtual module is configured to receive a first fabric login request by using the F port of the node port virtualization switch, where the first fabric login request includes a first world wide port name; send a second fabric discovery request by using one N port of the at least two N ports connected to the fibre channel switched fabric, where the second fabric discovery request includes the first world wide port name; and receive a second fabric discovery response by using the N port that sends the second fabric discovery request, where the second fabric discovery response includes a third N port identifier corresponding to the first world wide port name.

With reference to the sixth aspect or any one of the first implementation manner to the third implementation manner of the sixth aspect, in a fourth implementation manner of the sixth aspect, the apparatus further includes a second virtual module, where the second virtual module is configured to receive a first fabric discovery request by using the F port of the node port virtualization switch, where the first fabric discovery request includes the first world wide port name; send a second fabric discovery request by using one N port of the at least two N ports connected to the fibre channel switched fabric, where the second fabric discovery request includes the first world wide port name; and receive a second fabric discovery response by using the N port that sends the second fabric discovery request, where the second fabric discovery response includes a third N port identifier corresponding to the first world wide port name.

According to a seventh aspect, an embodiments of the present disclosure provides a node port virtualization switch, where the NPV switch includes at least two N ports, an F port, a processor, and a memory; the at least two N ports are connected to a fibre channel switched fabric, the at least two N ports are connected to the processor, the F port is connected to the processor, and the memory is connected to the processor; and the processor executes the following steps according to a program instruction stored by the memory receiving multiple first registered state change notifications by using multiple N ports of the at least two N ports, where the multiple first registered state change notifications carry a same first N port identifier, allocating, to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications, and sending a second registered state change notification by using the F port, where the second registered state change notification carries one of the multiple second N port identifiers.

In a first implementation manner of the seventh aspect, the node port virtualization switch further includes a forwarder, where the forwarder receives a fibre channel packet by using the F port of the node port virtualization switch, where a destination fibre channel identifier of the fibre channel packet is the second N port identifier, the forwarder replaces the destination fibre channel identifier of the fibre channel packet with the first N port identifier corresponding to the second N port identifier, and the forwarder sends the replaced fibre channel packet by using an N port corresponding to the second N port identifier.

With reference to the seventh aspect or the first implementation manner of the seventh aspect, in a second implementation manner of the seventh aspect, the node port virtualization switch further includes the forwarder, where the forwarder receives a fibre channel packet by using one N port of the at least two N ports, where a source fibre channel identifier of the fibre channel packet is the first N port identifier, the forwarder replaces the source fibre channel identifier of the fibre channel packet with a second N port identifier that is of the multiple second N port identifiers corresponding to the first N port identifier and that is corresponding to the N port that receives the fibre channel packet, and the forwarder sends the replaced fibre channel packet.

With reference to any one of the seventh aspect, the first implementation manner and the second implementation manner of the seventh aspect, in a third implementation manner of the seventh aspect, before executing, according to the program instruction stored by the memory, the step of the receiving, by the node port virtualization switch, a first registered state change notification by using any one of the at least two N ports, the processor further executes the following steps receiving a first fabric login request by using the F port, where the first fabric login request includes a first world wide port name; or receiving a first fabric discovery request by using the F port, where the first fabric discovery request includes a first world wide port name, sending a second fabric discovery request by using one N port of the at least two N ports connected to the fibre channel switched fabric, where the second fabric discovery request includes the first world wide port name, and receiving a second fabric discovery response by using the N port that sends the second fabric discovery request, where the second fabric discovery response includes a third N port identifier corresponding to the first world wide port name.

According to an eighth aspect, an embodiment of the present disclosure provides a system for implementing node port virtualization on a fibre channel, including a node port virtualization switch, where the node port virtualization switch is connected to a fibre channel switched fabric by using at least two N ports, and the node port virtualization switch is configured to receive multiple first registered state change notifications by using multiple N ports of the at least two N ports, where the multiple first registered state change notifications carry a same first N port identifier; allocate, to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications; and send a second registered state change notification by using an F port of the node port virtualization switch, where the second registered state change notification carries one of the multiple second N port identifiers.

In a first implementation manner of the eighth aspect, the node port virtualization switch is further configured to receive a fibre channel packet by using the F port of the node port virtualization switch, where a destination fibre channel identifier of the fibre channel packet is the second N port identifier; replace the destination fibre channel identifier of the fibre channel packet with the first N port identifier corresponding to the second N port identifier; and send the replaced fibre channel packet by using an N port corresponding to the second N port identifier.

With reference to the eighth aspect or the first implementation manner of the eighth aspect, in a second implementation manner of the eighth aspect, the node port virtualization switch is further configured to receive a fibre channel packet by using one N port of the at least two N ports, where a source fibre channel identifier of the fibre channel packet is the first N port identifier; replace the source fibre channel identifier of the fibre channel packet with a second N port identifier that is of the multiple second N port identifiers corresponding to the first N port identifier and that is corresponding to the N port that receives the fibre channel packet; and send the replaced fibre channel packet.

With reference to any one of the eighth aspect, the first implementation manner and the second implementation manner of the eighth aspect, in a third implementation manner of the eighth aspect, the node port virtualization switch is further configured to: before receiving the first registered state change notification by using any one of the at least two N ports, receive a first fabric login request by using the F port of the node port virtualization switch, where the first fabric login request includes a first world wide port name; or receive a first fabric discovery request by using the F port of the node port virtualization switch, where the first fabric discovery request includes a first world wide port name; send a second fabric discovery request by using one N port of the at least two N ports connected to the fibre channel switched fabric, where the second fabric discovery request includes the first world wide port name; and receive a second fabric discovery response by using the N port that sends the second fabric discovery request, where the second fabric discovery response includes a third N port identifier corresponding to the first world wide port name.

With reference to the eighth aspect or any one of the first implementation manner to the third implementation manner of the eighth aspect, in a fourth implementation manner of the eighth aspect, the system further includes a fibre channel switch, and the fibre channel switch is located in the fibre channel switched fabric.

With reference to the eighth aspect or any one of the first implementation manner to the fourth implementation manner of the eighth aspect, in a fifth implementation manner of the eighth aspect, the system further includes a node, and the node is connected to the node port virtualization switch.

Because second N_port IDs are allocated, to remote nodes, for more than one N_port of an NPV switch, regardless of which N_port of these N_ports a node connected to the NPV switch is registered for, the node can obtain the second N_port IDs that are of the remote nodes and that are corresponding to the N_port. Therefore, any node connected to the NPV switch can communicate with any remote node, thereby improving communication efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following illustrative embodiments describe a specific implementation process of the present disclosure by way of example. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
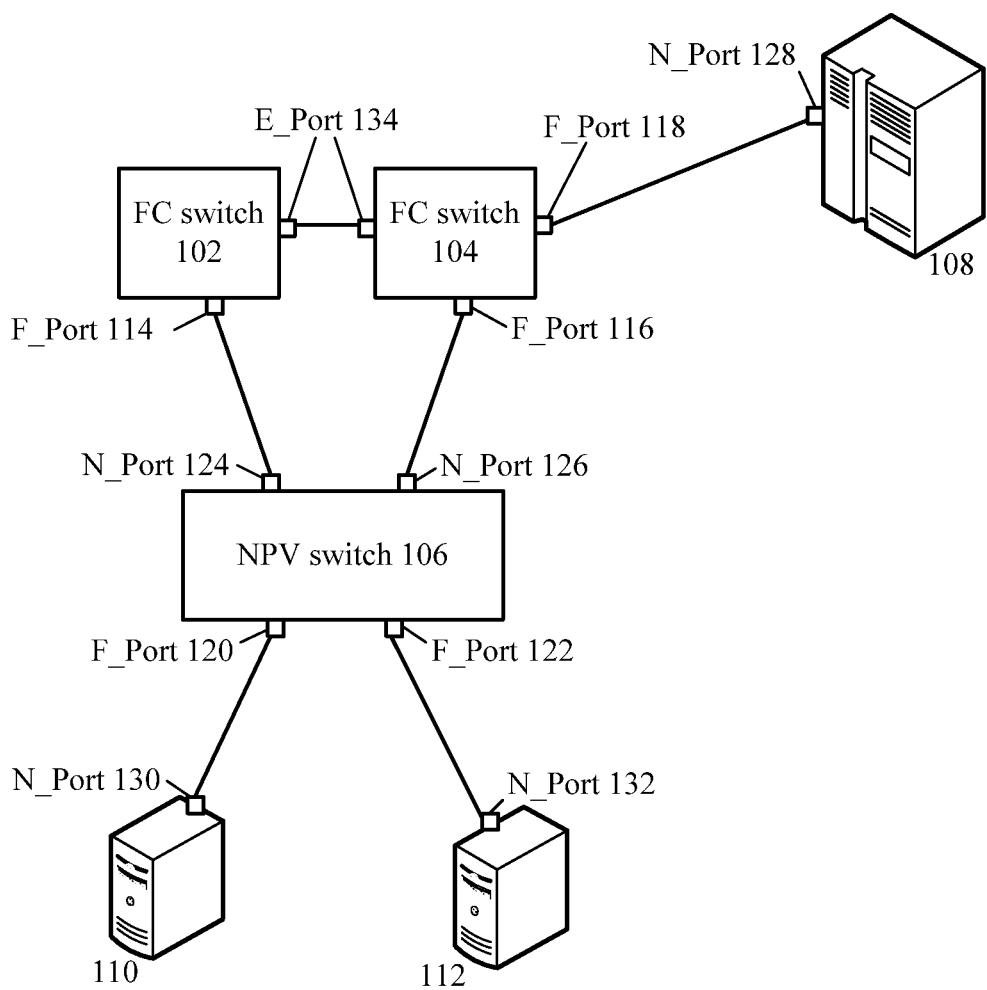
FIG. 1 is a schematic diagram of a network system according to an embodiment of the present disclosure.

FIG. 1 is a schematic diagram of a network system according to an embodiment of the present disclosure. 102 and 104 are fibre channel switches, and 102 and 104 belong to a same fibre channel switched fabric. 106 is a port virtualization switch. 108 to 112 are nodes, where a node may be a host, a server, or a storage device. 114 to 122 are F ports. 124 to 132 are N ports. 134 is an E port.

Figure 2:
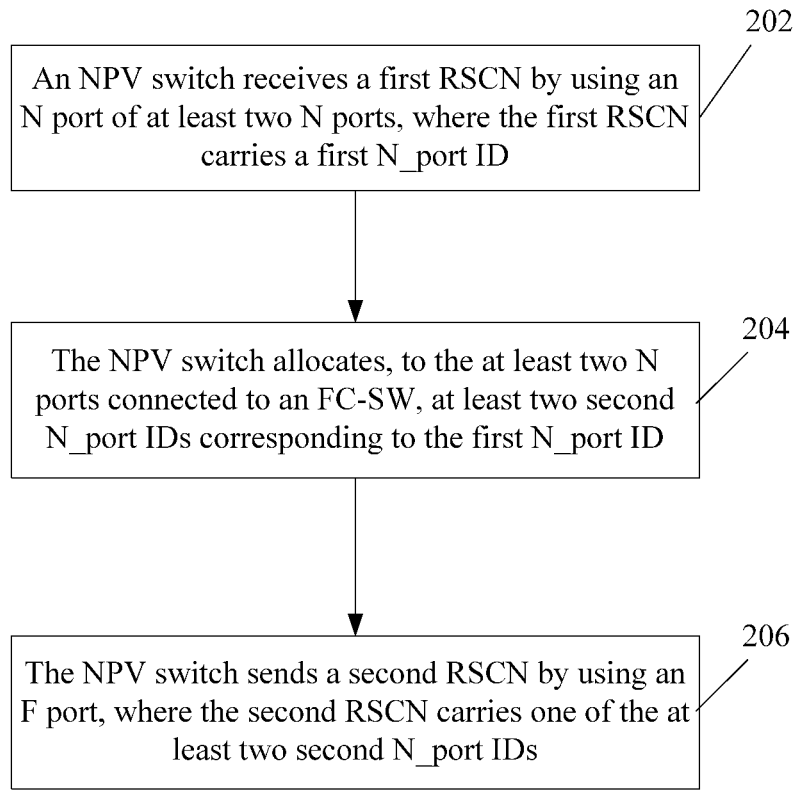
FIG. 2 is a flowchart of a method according to an embodiment of the present disclosure.

Referring to FIG. 1 and FIG. 2, an embodiment of the present disclosure provides a method for implementing node port virtualization on a fibre channel, where a node port virtualization switch is connected to a fibre channel switched fabric by at least two N ports. The FC-SW is a switched fabric that is accessed by the NPV switch. FIG. 2 is a flowchart of the method according to this embodiment of the present disclosure. The method includes 202: The NPV switch receives a first registered state change notification (RSCN) by an N port of the at least two N ports, where the first registered state change notification carries a first N port identifier (N_port ID).

Generally, each N port is corresponding to one physical port of the NPV switch. The physical port of the NPV switch may be implemented by an optical transceiver or an electrical transceiver.

In the Fibre Channel protocol (FC protocol), an RSCN is a notification that is of the FC switched fabric and that is sent to a node in case of any major switched fabric changes. Some events that trigger the RSCN are: a node joining or leaving the switched fabric; a switch joining or leaving the switched fabric; and changing a name of a switch.

The first N_port ID is a Fibre Channel identifier (FC ID) of an N port (for example, the N port 128 in FIG. 1) of a remote node (for example, the remote node 108 in FIG. 1). In a process in which the remote node joins an FC-SW (for example, the FC-SW in which the FC switches 102 and 104 in FIG. 1 are located), an FC switch (for example, the FC switch 104 in FIG. 1) in the FC-SW allocates an FC identifier to the N port of the remote node, where the FC identifier is the first N_port ID. The FC switch in the FC-SW is triggered to send, by using an F port (for example, the F port 116 in FIG. 1) of the FC switch, an RSCN carrying the first N_port ID. In this embodiment of the present disclosure, the RSCN carrying the first N_port ID is referred to as a first RSCN. After perceiving joining of the remote node, another FC switch (for example, the FC switch 102 in FIG. 1) in the FC-SW sends, by using an F port (for example, the F port 114 in FIG. 1) of the another FC switch, the first RSCN carrying the first N_port ID. The NPV switch receives the first RSCN by using an N port of the at least two N ports. The following describes this embodiment of the present disclosure by using an example in which the NPV switch receives the first RSCN by using the N port 126.

Before step 202, a node connected to the NPV switch is virtualized as a VN_port by the NPV switch, and a process is as follows First, the NPV switch receives a first fabric login (FLOGI) request by using an F port (for example, the F port 120 in FIG. 1) of the NPV switch, where the first FLOGI request includes a first WWPN; or the NPV switch receives a first fabric discovery (FDISC) request by using an F port (for example, the F port 120 in FIG. 1) of the NPV switch, where the first FDISC request includes a first WWPN.

The first WWPN is a WWPN of an N_port (for example, the N port 130 in FIG. 1) or a VN_port that is of the node (for example, the node 110 in FIG. 1) and that is connected to the NPV switch.

Then, the NPV switch sends a second FDISC request by using one N port (for example, the N port 126 in FIG. 1) of the at least two N ports connected to the FC-SW, where the second FDISC request includes the first WWPN.

The NPV switch may select, according to a load sharing rule, a network topology, a link status, a quality of service (QOS) policy, or any combination thereof, one N port from the at least two N ports to send the second FDISC request. The selected N port may be referred to as an N port for which the node is registered.

After an FC switch (for example, the FC switch 104 in FIG. 1) connected to the selected N port receives the second FDISC request, the FC switch allocates a corresponding N_port ID, that is, a third N_port ID, to the first WWPN included in the second FDISC request. The FC switch returns a second FDISC response including the third N_port ID to the NPV switch.

Finally, the NPV switch receives a second FDISC response by using the N port that sends the second FDISC request, where the second FDISC response includes the third N_port ID corresponding to the first WWPN. The NPV switch records a correspondence between the third N_port ID and the N_port that receives the second FDISC response.

The NPV switch returns a first FLOGI response to the node, or the NPV switch returns a first FDISC response to the node. In a situation in which the NPV switch receives the first FLOGI request, the NPV switch returns the first FLOGI response to the node. In a situation in which the NPV switch receives the first FDISC request, the NPV switch returns the first FDISC response to the node.

Optionally, the NPV switch returns a first FLOGI response including the third N_port ID or a first FDISC response including the third N_port ID to the node.

Optionally, the NPV switch allocates a fourth N_port ID to the first WWPN, establishes a correspondence between the third N_port ID and the fourth N_port ID, and returns a first FLOGI response including the fourth N_port ID or a first FDISC response including the fourth N_port ID to the node. The solution is a common transparent router solution. In a situation in which the solution is used, the step of allocating the fourth N_port ID to the first WWPN and returning the first FLOGI response or the first FDISC response of the fourth N_port ID and the step of sending the second FDISC request may be performed at the same time. After the third N_port ID is acquired, the NPV switch records the correspondence between the third N_port ID and the N_port that receives the second FDISC response. Further, the NPV switch records the correspondence between the third N_port ID and the fourth N_port ID.

204: The node port virtualization switch allocates, to the at least two N ports connected to the fibre channel switched fabric, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports connected to the fibre channel switched fabric.

Information about which N_ports are connected to a same FC-SW is pre-configured on the NPV switch. Alternatively, the NPV switch may determine, in an automatic discovery manner, which N_ports are connected to a same FC-SW as the N_port that receives the first RSCN.

The NPV switch allocates one N_port ID to each of the at least two N_ports connected to the FC-SW. The N_port ID is a virtual N_port ID that is of the N port of the remote node and that is for the N_port of the NPV switch, rather than an N_port ID of the N_port of the NPV switch. Although values of these N_port IDs are different, they are collectively referred to as the second N_port ID in this embodiment of the present disclosure. Generally, any second N_port ID is different from the first N_port ID; however, a possibility that one second N_port ID is the same as the first N_port ID is not ruled out.

There is a bijection relationship between all the second N_port IDs corresponding to one first N_port ID and the at least two N_ports connected to the FC-SW. That is, in a situation in which one first N_port ID and one N_port of the at least two N_ports are determined, one and only one second N_port ID can be found to correspond to the first N_port ID and the N_port; and in a situation in which one second N_port ID is determined, one and only one N_port can be found to correspond to the second N_port ID. The NPV switch records a correspondence between all the second N_port IDs corresponding to the first N_port ID and the at least two N_ports connected to the FC-SW.

The NPV switch is triggered only by a first RSCN that carries the same first N_port ID and that is received by the NPV switch, to perform allocation of the second N_port ID. Generally, the NPV switch does not change, under the trigger of multiple first RSCNs that carry a same first N_port ID, a correspondence between the second N_port ID that has been allocated by the NPV switch and the at least two N_ports connected to the FC-SW.

206: The node port virtualization switch sends a second registered state change notification by using an F port of the NPV switch, where the second registered state change notification carries one of the at least two second N port identifiers.

The NPV switch sends, by using the second RSCN, the N_port ID of the remote node to the node (for example, the node 110 in FIG. 1) that is connected to the NPV switch. To enable nodes registered for different N_ports of the NPV switch to communicate with the remote node at the same time, the NPV switch virtualizes the remote node as multiple different remote nodes, that is, remote nodes whose N_port IDs are the different second N_port IDs. For an N_port on the NPV switch, the NPV switch sends, by using the second RSCN and according to the correspondence that is between the third N_port ID and the N_port of the NPV switch and that is recorded by the NPV switch, the second N_port ID to all nodes corresponding to the third N_port ID corresponding to the N_port, that is, sends, by using the second RSCN, the second N_port ID to all nodes registered for the N_port. For example, a destination FC ID of the second RSCN is the third N_port ID, and the second RSCN carries the second N_port ID. For another example, in the transparent router solution, a destination FC ID of the second RSCN is the fourth N_port ID corresponding to the third N_port ID, and the second RSCN carries the second N_port ID. Generally, a quantity of second RSCNs sent by the NPV switch is equal to a quantity of nodes registered for the N_port. The NPV switch may proactively send, for each N port of the at least two N ports connected to the FC-SW, a second RSCN to all nodes registered for the N_port. Second N_port IDs that are carried in second RSCNs are different second N_port IDs corresponding to the N ports, where the second RSCNs are sent to nodes for different N ports. Alternatively, the NPV switch may send, for the N port that receives the first RSCN, a second RSCN to all nodes registered for the N_port, that is, sends the second RSCN under the trigger of the first RSCN.

Because second N_port IDs are allocated, to remote nodes, for all N_ports of the NPV switch, regardless of which N_port of these N_ports a node connected to the NPV switch is registered for, the node can obtain the second N_port IDs that are of the remote nodes and that are corresponding to the N_port. Therefore, any node connected to the NPV switch can communicate with any remote node, thereby improving communication efficiency. A communication process is described as follows: When communicating with a remote node, a node connected to the NPV switch sends an FC packet to the remote node. The NPV switch receives the FC packet by using the F port of the NPV switch, where a destination FC ID of the FC packet is a second N_port ID. The NPV switch replaces the destination FC ID of the FC packet with a first N_port ID corresponding to the second N_port ID. Because there is a bijection relationship between all the second N_port IDs corresponding to one first N_port ID and the at least two N_ports connected to the FC-SW, the NPV switch may find, according to a second N_port ID, a unique N_port that is corresponding to the second N_port ID, to send the replaced FC packet. In the transparent router solution, a source FC ID of the FC packet is the fourth N_port ID. In the transparent router solution, further, the NPV switch replaces the source FC ID of the FC packet with the third N_port ID according to the correspondence between the third N_port ID and the fourth N_port ID. The NPV switch sends the replaced FC packet by using an N_port corresponding to the second N_port ID.

When communicating with a node connected to the NPV switch, a remote node sends an FC packet to the node connected to the NPV switch. The NPV switch receives the FC packet by using one N port of the at least two N ports connected to the FC-SW, where a source FC ID of the FC packet is a first N_port ID. The NPV switch replaces the source FC ID of the FC packet with a second N_port ID that is of the at least two second N_port IDs corresponding to the first N_port ID and that is corresponding to the N port that receives the FC packet. Because there is a bijection relationship between all the second N_port IDs corresponding to one first N_port ID and the at least two N_ports connected to the FC-SW, the NPV switch may find, according to the first N_port ID and the N port that receives the FC packet, a unique second N_port ID corresponding to the first N_port ID. A destination FC ID of the FC packet is the third N_port ID. In the transparent router solution, further, the NPV switch replaces the destination FC ID of the FC packet with the fourth N_port ID according to the correspondence between the third N_port ID and the fourth N_port ID. The NPV switch sends the replaced FC packet; the NPV switch sends the replaced FC packet by using the F_port.

Figure 3:
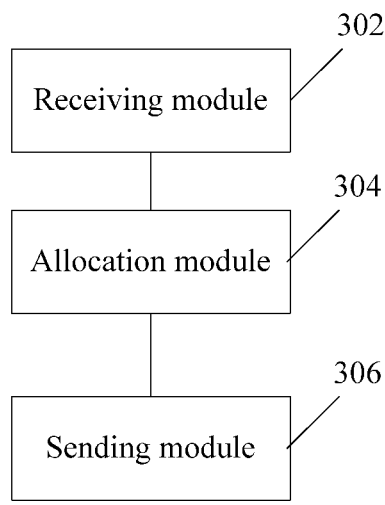
FIG. 3 is a structural diagram of an apparatus for implementing node port virtualization on a fibre channel according to an embodiment of the present disclosure.

Referring to FIG. 1 and FIG. 3, an embodiment of the present disclosure provides an apparatus for implementing node port virtualization on a fibre channel, where the apparatus for implementing node port virtualization is implemented by a node port virtualization switch, and the NPV switch is connected to a fibre channel switched fabric by using at least two N ports. The FC-SW is a switched fabric that is accessed by the NPV switch. FIG. 3 is a structural diagram of the apparatus for implementing node port virtualization on a fibre channel according to this embodiment of the present disclosure. The apparatus includes a receiving module 302, an allocation module 304, and a sending module 306.

The receiving module 302 is configured to receive a first registered state change notification by using an N port of the at least two N ports, where the first registered state change notification carries a first N port identifier.

Generally, each N port is corresponding to one physical port of the NPV switch.

In the FC protocol, an RSCN is a notification that is of the FC switched fabric and that is sent to a node in a situation in which any major change occurs in the switched fabric. Some events triggering the RSCN are that: a node joins or leaves the switched fabric; a switch joins or leaves the switched fabric; and a name of a switch changes.

The first N_port ID is an FC ID of an N port (for example, the N port 128 in FIG. 1) of a remote node (for example, the remote node 108 in FIG. 1). In a process in which the remote node joins an FC-SW (for example, the FC-SW in which the FC switches 102 and 104 in FIG. 1 are located), an FC switch (for example, the FC switch 104 in FIG. 1) in the FC-SW allocates an FC identifier to the N port of the remote node, where the FC identifier is the first N_port ID. The FC switch in the FC-SW is triggered to send, by using an F port (for example, the F port 116 in FIG. 1) of the FC switch, an RSCN carrying the first N_port ID. In this embodiment of the present disclosure, the RSCN carrying the first N_port ID is referred to as a first RSCN. After perceiving joining of the remote node, another FC switch (for example, the FC switch 102 in FIG. 1) in the FC-SW sends, by using an F port (for example, the F port 114 in FIG. 1) of the another FC switch, the first RSCN carrying the first N_port ID. The receiving module of the apparatus for node port virtualization receives the first RSCN by using the N port of the at least two N ports, where the apparatus is implemented by the NPV switch. The following describes this embodiment of the present disclosure by using an example in which the NPV switch receives the first RSCN by using the N port 126.

The apparatus for NPV further includes a first virtual module, a second virtual module, or a combination thereof, where the apparatus is implemented by the NPV switch. Before the receiving module receives the first RSCN, a node connected to the NPV switch is virtualized as a VN_port by the NPV switch, and the process is executed by the first virtual module, the second virtual module, or the combination thereof.

The first virtual module is configured to receive a first FLOGI request by using an F port (for example, the F port 120 in FIG. 1) of the NPV switch, where the first FLOGI request includes a first WWPN; send a second FDISC request by using one N port (for example, the N port 126 in FIG. 1) of the at least two N ports connected to the FC-SW, where the second FDISC request includes the first WWPN; and receive a second FDISC response by using the N port that sends the second FDISC request, where the second FDISC response includes a third N_port ID corresponding to the first WWPN.

The second virtual module is configured to receive a first FDISC request by using the F port (for example, the F port 120 in FIG. 1) of the NPV switch, where the first FDISC request includes the first WWPN; send a second FDISC request by using one N port (for example, the N port 126 in FIG. 1) of the at least two N ports connected to the FC-SW, where the second FDISC request includes the first WWPN; and receive a second FDISC response by using the N port that sends the second FDISC request, where the second FDISC response includes the third N_port ID corresponding to the first WWPN.

The apparatus for node port virtualization records a correspondence between the third N_port ID and the N_port that receives the second FDISC response.

The first WWPN is a WWPN of an N_port (for example, the N port 130 in FIG. 1) or a VN_port that is of the node (for example, the node 110 in FIG. 1) and that is connected to the NPV switch.

The first virtual module, the second virtual module, or the combination thereof may select, according to a load sharing rule, a network topology, a link status, a QOS policy, or any combination thereof, one N port from the at least two N ports to send the second FDISC request. The selected N port may be referred to as an N port for which the node is registered.

After an FC switch (for example, the FC switch 104 in FIG. 1) connected to the selected N port receives the second FDISC request, the FC switch allocates a corresponding N_port ID, that is, the third N_port ID, to the first WWPN included in the second FDISC request. The FC switch returns the second FDISC response including the third N_port ID to the NPV switch.

The first virtual module is further configured to return a first FLOGI response to the node. The second virtual module is further configured to return a first FDISC response to the node.

Optionally, the first virtual module returns the first FLOGI response including the third N_port ID to the node. Optionally, the second virtual module returns the first FDISC response including the third N_port ID to the node.

Optionally, the first virtual module allocates a fourth N_port ID to the first WWPN, establishes a correspondence between the third N_port ID and the fourth N_port ID, and returns a first FLOGI response including the fourth N_port ID to the node. Optionally, the second virtual module allocates a fourth N_port ID to the first WWPN, establishes a correspondence between the third N_port ID and the fourth N_port ID, and returns a first FDISC response including the fourth N_port ID to the node. The solution is a common transparent router solution. In a situation in which the solution is used, the first virtual module and the second virtual module may perform the step of allocating the fourth N_port ID to the first WWPN and returning the first FLOGI response or the first FDISC response of the fourth N_port ID and the step of sending the second FDISC request at the same time. After the third N_port ID is acquired, the apparatus for NPV records the correspondence between the third N_port ID and the N_port that receives the second FDISC response. Further, the apparatus for NPV records the correspondence between the third N_port ID and the fourth N_port ID.

The allocation module 304 is configured to allocate, to the at least two N ports connected to the fibre channel switched fabric, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports connected to the fibre channel switched fabric.

The allocation module 304 may acquire pre-configured information that is about which N_ports are connected to a same FC-SW and that is on the NPV switch. Alternatively, the allocation module 304 may determine, in an automatic discovery manner, which N_ports are connected to a same FC-SW as the N_port that receives the first RSCN.

The allocation module 304 allocates one N_port ID to each of the at least two N_ports connected to the FC-SW. The N_port ID is a virtual N_port ID that is of the N port of the remote node and that is for the N_port of the NPV switch, rather than an N_port ID of the N_port of the NPV switch. Although values of these N_port IDs are different, they are collectively referred to as the second N_port ID in this embodiment of the present disclosure. Generally, any second N_port ID is different from the first N_port ID; however, a possibility that one second N_port ID is the same as the first N_port ID is not ruled out.

There is a bijection relationship between all the second N_port IDs corresponding to one first N_port ID and the at least two N_ports connected to the FC-SW. That is, in a situation in which one first N_port ID and one N_port of the at least two N_ports are determined, one and only one second N_port ID can be found to correspond to the first N_port ID and the N_port; and in a situation in which one second N_port ID is determined, one and only one N_port can be found to correspond to the second N_port ID. The NPV switch records a correspondence between all the second N_port IDs corresponding to the first N_port ID and the at least two N_ports connected to the FC-SW.

The allocation module 304 is triggered only by a first RSCN that carries the same first N_port ID and that is received by the allocation module 304, to perform allocation of the second N_port ID. Generally, the allocation module 304 does not change, under the trigger of multiple first RSCNs that carry a same first N_port ID, a correspondence between the second N_port ID that has been allocated by the allocation module 304 and the at least two N_ports connected to the FC-SW.

The sending module 306 is configured to send a second registered state change notification by using the F port of the NPV switch, where the second registered state change notification carries one of the at least two second N port identifiers.

The sending module 306 sends, by using the second RSCN, the N_port ID of the remote node to the node (for example, the node 110 in FIG. 1) that is connected to the NPV switch. To enable nodes registered for different N_ports of the NPV switch to communicate with the remote node at the same time, the apparatus for implementing NPV virtualizes the remote node as multiple different remote nodes, that is, remote nodes whose N_port IDs are the different second N_port IDs. For an N_port on the NPV switch, the apparatus for implementing NPV sends, by using the second RSCN and according to the correspondence that is between the third N_port ID and the N_port of the NPV switch and that is recorded by the apparatus for implementing NPV, the second N_port IDs to all nodes corresponding to the third N_port ID corresponding to the N_port, that is, sends, by using the second RSCN, the second N_port IDs to all nodes registered for the N_port. For example, a destination FC ID of the second RSCN is the third N_port ID, and the second RSCN carries the second N_port IDs. For another example, in the transparent router solution, a destination FC ID of the second RSCN is the fourth N_port ID corresponding to the third N_port ID, and the second RSCN carries the second N_port IDs. Generally, a quantity of second RSCNs sent by the sending module 306 is equal to a quantity of nodes registered for the N_port. The sending module 306 may proactively send, for each N port of the at least two N ports connected to the FC-SW, a second RSCN to all nodes registered for the N_port. Second N_port IDs that are carried in second RSCNs are different second N_port IDs corresponding to the N ports, where the second RSCNs are sent to nodes for different N ports. Alternatively, the sending module 306 may send, for the N port that receives the first RSCN, a second RSCN to all nodes registered for the N_port, that is, sends the second RSCN under the trigger of the first RSCN.

Because second N_port IDs are allocated, to remote nodes, for all N_ports of the NPV switch, regardless of which N_port of these N_ports a node connected to the NPV switch is registered for, the node can obtain the second N_port IDs that are of the remote node and that are corresponding to the N_port. Therefore, any node connected to the NPV switch can communicate with any remote node, thereby improving communication efficiency. A communication process is described as follows: When communicating with a remote node, a node connected to the NPV switch sends an FC packet to the remote node. The receiving module 302 is further configured to receive the FC packet by using the F port of the NPV switch, where a destination FC ID of the FC packet is a second N_port ID. The sending module 306 is further configured to replace the destination FC ID of the FC packet with a first N_port ID corresponding to the second N_port ID. Because there is a bijection relationship between all the second N_port IDs corresponding to one first N_port ID and the at least two N_ports connected to the FC-SW, the sending module 306 may find, according to a second N_port ID, a unique N_port that is corresponding to the second N_port ID, to send the replaced FC packet. In the transparent router solution, a source FC ID of the FC packet is the fourth N_port ID. In the transparent router solution, further, the sending module 306 is further configured to replace the source FC ID of the FC packet with the third N_port ID according to the correspondence between the third N_port ID and the fourth N_port ID. The sending module 306 is further configured to send the replaced FC packet by using an N_port corresponding to the second N_port ID.

When communicating with a node connected to the NPV switch, a remote node sends an FC packet to the node connected to the NPV switch. The receiving module 302 is further configured to receive the FC packet by using one N port of the at least two N ports connected to the FC-SW, where a source FC ID of the FC packet is a first N_port ID. The sending module 306 is further configured to replace the source FC ID of the FC packet with a second N_port ID that is of the at least two second N_port IDs corresponding to the first N_port ID and that is corresponding to the N port that receives the FC packet. Because there is a bijection relationship between all the second N_port IDs corresponding to one first N_port ID and the at least two N_ports connected to the FC-SW, the sending module 306 may find, according to the first N_port ID and the N port that receives the FC packet, a unique second N_port ID corresponding to the first N_port ID. A destination FC ID of the FC packet is the third N_port ID. In the transparent router solution, further, the sending module 306 is further configured to replace the destination FC ID of the FC packet with the fourth N_port ID according to the correspondence between the third N_port ID and the fourth N_port ID. The sending module 306 is further configured to send the replaced FC packet; the NPV switch sends the replaced FC packet by using the F_port.

Figure 4:
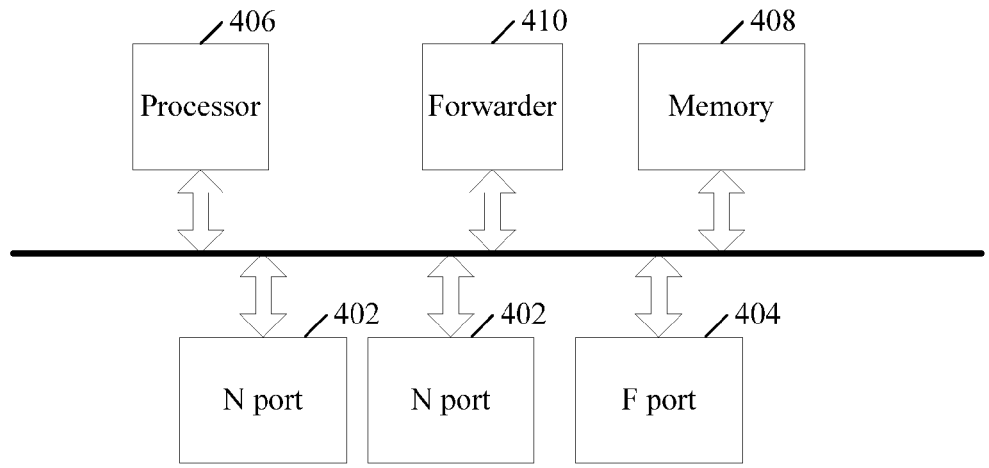
FIG. 4 is a structural diagram of an NPV switch according to an embodiment of the present disclosure.

Referring to FIG. 1 and FIG. 4, an embodiment of the present disclosure provides a NPV switch. The NPV switch refers to a fibre channel switch working in NPV mode, which is hereinafter referred to as an NPV switch for short. FIG. 4 is a structural diagram of the NPV switch according to this embodiment of the present disclosure. The NPV switch includes at least two N ports 402, an F port 404, a processor 406, and a memory 408. The at least two N ports 402 are connected to an FC-SW. The FC-SW is a switched fabric that is accessed by the NPV switch. The at least two N ports 402 may be physically implemented by an optical transceiver or an electrical transceiver. The F port 404 may be physically implemented by an optical transceiver or an electrical transceiver. For example, the optical transceiver may be a small form-factor pluggable (SFP) transceiver, an enhanced small form-factor pluggable (SFP+) transceiver, or a 10 Gigabit small form-factor pluggable (XFP) transceiver. The processor 406 may be a central processing unit (CPU). The memory 408 may be a volatile memory, for example, a random-access memory (RAM), or a non-volatile memory, for example, a read-only memory (ROM), a flash memory, a hard disk drive (HDD), or a solid-state disk (SSD). The at least two N ports 402, the F port 404, and the memory 408 are all connected to the processor 406. A bold line in FIG. 4 is a bus. The processor 406 executes, according to a program instruction stored in the memory 408, some operation steps in the embodiment shown in FIG. 2.

First, the processor 406 receives a first registered state change notification by using an N port of the at least two N ports 402, where the first registered state change notification carries a first N port identifier.

In the Fibre Channel protocol, an RSCN is a notification that is of the FC switched fabric and that is sent to a node in a situation in which any major change occurs in the switched fabric. Some events triggering the RSCN are that: a node joins or leaves the switched fabric; a switch joins or leaves the switched fabric; and a name of a switch changes.

The first N_port ID is an FC ID of an N port (for example, the N port 128 in FIG. 1) of a remote node (for example, the remote node 108 in FIG. 1). In a process in which the remote node joins an FC-SW (for example, an FC-SW in which the FC switches 102 and 104 in FIG. 1 are located), an FC switch (for example, the FC switch 104 in FIG. 1) in the FC-SW allocates an FC identifier to the N port of the remote node, where the FC identifier is the first N_port ID. The FC switch in the FC-SW is triggered to send, by using an F port (for example, the F port 116 in FIG. 1) of the FC switch, an RSCN carrying the first N_port ID. In this embodiment of the present disclosure, the RSCN carrying the first N_port ID is referred to as a first RSCN. After perceiving joining of the remote node, another FC switch (for example, the FC switch 102 in FIG. 1) in the FC-SW sends, by using an F port (for example, the F port 114 in FIG. 1) of the another FC switch, the first RSCN carrying the first N_port ID. The processor 406 of the NPV switch receives the first RSCN by using the N port of the at least two N ports 402. The following describes this embodiment of the present disclosure by using an example in which the NPV switch receives the first RSCN by using the N port 126.

Before the first RSCN is received, a node connected to the NPV switch is virtualized as a VN_port by the NPV switch, and a process is as follows Step 1: The processor 406 of the NPV switch receives a first FLOGI request by using the F port 404 (for example, the F port 120 in FIG. 1) of the NPV switch, where the first FLOGI request includes a first WWPN, or the processor 406 of the NPV switch receives a first FDISC request by using the F port 404 (for example, the F port 120 in FIG. 1) of the NPV switch, where the first FDISC request includes a first WWPN.

The first WWPN is a WWPN of an N_port (for example, the N port 130 in FIG. 1) or a VN_port that is of the node (for example, the node 110 in FIG. 1) and that is connected to the NPV switch.

Step 2: The processor 406 of the NPV switch sends a second FDISC request by using one N port (for example, the N port 126 in FIG. 1) of the at least two N ports 402 connected to the FC-SW, where the second FDISC request includes the first WWPN.

The processor 406 of the NPV switch may select, according to a load sharing rule, a network topology, a link status, a QOS policy, or any combination thereof, one N port from the at least two N ports 402 to send the second FDISC request. The selected N port may be referred to as an N port for which the node is registered.

After an FC switch (for example, the FC switch 104 in FIG. 1) connected to the selected N port receives the second FDISC request, the FC switch allocates a corresponding N_port ID, that is, a third N_port ID, to the first WWPN included in the second FDISC request. The FC switch returns a second FDISC response including the third N_port ID to the NPV switch.

Step 3: The processor 406 of the NPV switch receives a second FDISC response by using the N port that sends the second FDISC request, where the second FDISC response includes the third N_port ID corresponding to the first WWPN. The processor 406 of the NPV switch records, in the memory 408, a correspondence between the third N_port ID and the N_port that receives the second FDISC response.

The processor 406 of the NPV switch returns a first FLOGI response to the node, or the processor 406 of the NPV switch returns a first FDISC response to the node. In a situation in which the first FLOGI request is received, the processor 406 returns the first FLOGI response to the node. In a situation in which the first FDISC request is received, the processor 406 returns the first FDISC response to the node.

Optionally, the processor 406 of the NPV switch returns a first FLOGI response including the third N_port ID or a first FDISC response including the third N_port ID to the node.

Optionally, the processor 406 of the NPV switch allocates a fourth N_port ID to the first WWPN, establishes a correspondence between the third N_port ID and the fourth N_port ID, and returns a first FLOGI response including the fourth N_port ID or a first FDISC response including the fourth N_port ID to the node. The solution is a common transparent router solution. In a situation in which the solution is used, the step of allocating the fourth N_port ID to the first WWPN and returning the first FLOGI response or the first FDISC response of the fourth N_port ID and the step of sending the second FDISC request may be performed by the processor 406 at the same time. After the third N_port ID is acquired, the processor 406 of the NPV switch records, in the memory 408, the correspondence between the third N_port ID and the N_port that receives the second FDISC response. Further, the processor 406 of the NPV switch records, in the memory 408, the correspondence between the third N_port ID and the fourth N_port ID.

Then, the processor 406 allocates, to the at least two N ports 402 connected to the fibre channel switched fabric, at least two second N port identifiers corresponding to the first N port identifier, where the at least two second N port identifiers corresponding to the same first N port identifier are different, and there is a bijection relationship between the at least two second N port identifiers corresponding to the same first N port identifier and the at least two N ports 402 connected to the fibre channel switched fabric.

Information about which N_ports are connected to a same FC-SW is pre-configured in the memory 408 of the NPV switch. The processor 406 acquires the information from the memory 408. Alternatively, the processor 406 may determine, in an automatic discovery manner, which N_ports are connected to a same FC-SW as the N_port that receives the first RSCN.

The processor 406 allocates one N_port ID to each of the at least two N_ports connected to the FC-SW. The N_port ID is a virtual N_port ID that is of the N port of the remote node and that is for the N_port of the NPV switch, rather than an N_port ID of the N_port of the NPV switch. Although values of these N_port IDs are different, they are collectively referred to as the second N_port ID in this embodiment of the present disclosure. Generally, any second N_port ID is different from the first N_port ID; however, a possibility that one second N_port ID is the same as the first N_port ID is not ruled out.

There is a bijection relationship between all the second N_port IDs corresponding to one first N_port ID and the at least two N_ports connected to the FC-SW. That is, in a situation in which one first N_port ID and one N_port of the at least two N_ports are determined, one and only one second N_port ID can be found to correspond to the first N_port ID and the N_port; and in a situation in which one second N_port ID is determined, one and only one N_port can be found to correspond to the second N_port ID. The processor 406 records, in the memory 408, a correspondence between all the second N_port IDs corresponding to the first N_port ID and the at least two N_ports connected to the FC-SW.

The processor 406 of the NPV switch is triggered only by a first RSCN that carries the same first N_port ID and that is received by the processor 406, to perform allocation of the second N_port ID. Generally, the processor 406 of the NPV switch does not change, under the trigger of multiple first RSCNs that carry a same first N_port ID, a correspondence between the second N_port ID that has been allocated by the processor 406 and the at least two N_ports connected to the FC-SW.

Finally, the processor 406 sends a second registered state change notification by using the F port 404 of the NPV switch, where the second registered state change notification carries one of the at least two second N port identifiers.

The processor 406 sends, by using the second RSCN, the N_port ID of the remote node to the node (for example, the node 110 in FIG. 1) that is connected to the NPV switch. To enable nodes registered for different N_ports of the NPV switch to communicate with the remote node at the same time, the NPV switch virtualizes the remote node as multiple different remote nodes, that is, remote nodes whose N_port IDs are the different second N_port IDs. For an N_port on the NPV switch, the processor 406 sends, by using the second RSCN and according to the correspondence that is between the third N_port ID and the N_port of the NPV switch and that is recorded by the processor 406 in the memory 408, the second N_port ID to all nodes corresponding to the third N_port ID corresponding to the N_port, that is, sends, by using the second RSCN, the second N_port ID to all nodes registered for the N_port. For example, a destination FC ID of the second RSCN is the third N_port ID, and the second RSCN carries the second N_port ID. For another example, in the transparent router solution, a destination FC ID of the second RSCN is the fourth N_port ID corresponding to the third N_port ID, and the second RSCN carries the second N_port ID. Generally, a quantity of second RSCNs sent by the NPV switch is equal to a quantity of nodes registered for the N_port. The processor 406 of the NPV switch may proactively send, for each N port of the at least two N ports 402 connected to the FC-SW, a second RSCN to all nodes registered for the N_port. Second N_port IDs that are carried in second RSCNs are different second N_port IDs corresponding to the N port, where the second RSCNs are sent to nodes for different N ports. Alternatively, the processor 406 of the NPV switch may send, for the N port that receives the first RSCN, a second RSCN to all nodes registered for the N_port, that is, sends the second RSCN under the trigger of the first RSCN.

Because second N_port IDs are allocated, to remote nodes, for all N_ports of the NPV switch, regardless of which N_port of these N_ports a node connected to the NPV switch is registered for, the node can obtain the second N_port IDs that are of the remote node and that are corresponding to the N_port. Therefore, any node connected to the NPV switch can communicate with any remote node, thereby improving communication efficiency.

The NPV switch further includes a forwarder 410, where the forwarder 410 is configured to forward an FC packet. The forwarder may be an application-specific integrated circuit (ASIC), a field-programmable gate array (FPGA), or a network processor (NP). The forwarder 410 is connected to the at least two N ports 402, the F port 404, and the memory 408 by using the bus.

When communicating with a remote node, a node connected to the NPV switch sends an FC packet to the remote node. The forwarder 410 of the NPV switch receives the FC packet by using the F port 404 of the NPV switch, where a destination FC ID of the FC packet is a second N_port ID. The forwarder 410 of the NPV switch replaces the destination FC ID of the FC packet with a first N_port ID corresponding to the second N_port ID. Because there is a bijection relationship between all the second N_port IDs corresponding to one first N_port ID and the at least two N_ports connected to the FC-SW, the forwarder 410 of the NPV switch may find, according to a second N_port ID, a unique N_port that is corresponding to the second N_port ID, to send the replaced FC packet. In the transparent router solution, a source FC ID of the FC packet is the fourth N_port ID. In the transparent router solution, further, the forwarder 410 of the NPV switch replaces the source FC ID of the FC packet with the third N_port ID according to the correspondence between the third N_port ID and the fourth N_port ID. The forwarder 410 of the NPV switch sends the replaced FC packet by using an N_port corresponding to the second N_port ID.

When communicating with a node connected to the NPV switch, a remote node sends an FC packet to the node connected to the NPV switch. The forwarder 410 of the NPV switch receives the FC packet by using one N port of the at least two N ports 402 connected to the FC-SW, where a source FC ID of the FC packet is a first N_port ID. The forwarder 410 of the NPV switch replaces the source FC ID of the FC packet with a second N_port ID that is of the at least two second N_port IDs corresponding to the first N_port ID and that is corresponding to the N port that receives the FC packet. Because there is a bijection relationship between all the second N_port IDs corresponding to one first N_port ID and the at least two N_ports connected to the FC-SW, the forwarder 410 of the NPV switch may find, according to the first N_port ID and the N port that receives the FC packet, a unique second N_port ID corresponding to the first N_port ID. A destination FC ID of the FC packet is the third N_port ID. In the transparent router solution, further, the forwarder 410 of the NPV switch replaces the destination FC ID of the FC packet with the fourth N_port ID according to the correspondence between the third N_port ID and the fourth N_port ID. The NPV switch sends the replaced FC packet; the NPV switch sends the replaced FC packet by using the F_port.

The correspondence used by the forwarder 410 for replacing and forwarding the FC packet may be acquired from the memory 408 by the forwarder 410 after the FC packet is received. Alternatively, the forwarder 410 may periodically acquire, from the memory 408, the correspondence that is required for replacing and forwarding the FC packet, and save the correspondence in a memory in the forwarder 410; or when the correspondence changes, the processor 406 may save, in a memory in the forwarder 410, the correspondence that is required for replacing and forwarding the FC packet. A manner of periodically acquiring a correspondence and a manner of acquiring a correspondence when the correspondence changes may coexist.

Figure 5:
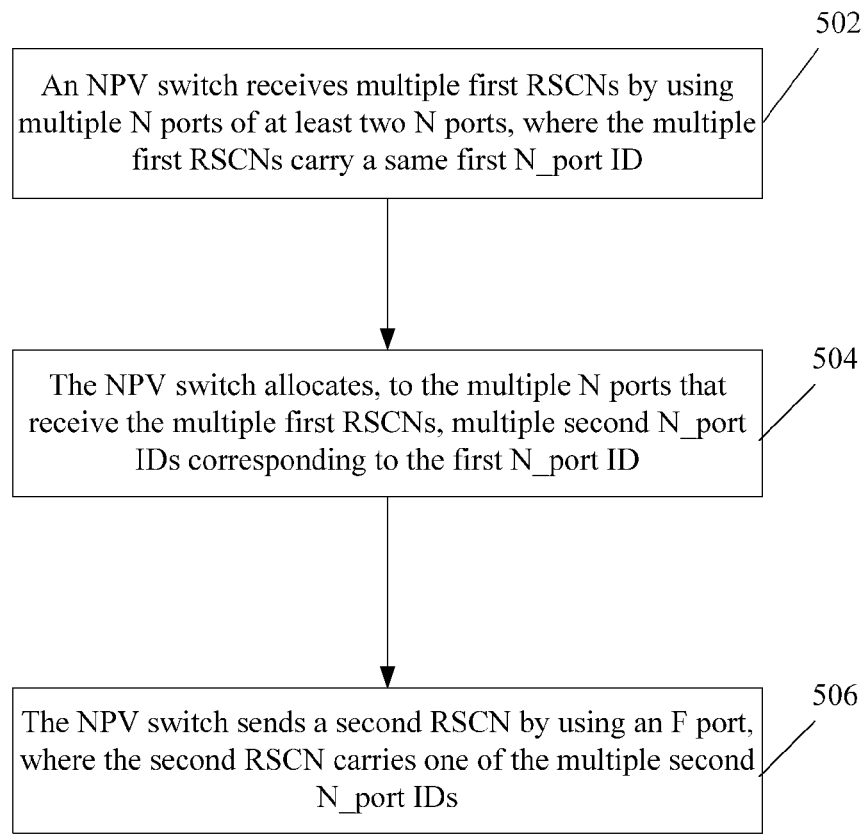
FIG. 5 is a flowchart of a method according to an embodiment of the present disclosure.

Referring to FIG. 1 and FIG. 5, an embodiment of the present disclosure provides another method for implementing NPV on a fibre channel, where a NPV switch is connected to a fibre channel switched fabric by using at least two N ports. The FC-SW is a switched fabric that is accessed by the NPV switch. The method is similar to the method provided by the embodiment shown in FIG. 2, and a difference lies in that: instead of allocating a second N_port ID to each of all the N ports connected to the FC-SW, the NPV switch allocates a second N_port ID to each N port that receives a first RSCN. FIG. 5 is a flowchart of the method according to this embodiment of the present disclosure. The method includes 502: The NPV switch receives multiple first registered state change notifications by using multiple N ports of the at least two N ports, where the multiple first registered state change notifications carry a same first N port identifier.

Generally, each N port is corresponding to one physical port of the NPV switch. The physical port of the NPV switch may be implemented by an optical transceiver or an electrical transceiver.

In the Fibre Channel protocol, an RSCN is a notification that is of the FC switched fabric and that is sent to a node in a situation in which any major change occurs in the switched fabric. Some events triggering the RSCN are that: a node joins or leaves the switched fabric; a switch joins or leaves the switched fabric; and a name of a switch changes.

The first N_port ID is an FC ID of an N port (for example, the N port 128 in FIG. 1) of a remote node (for example, the remote node 108 in FIG. 1). In a process in which the remote node joins an FC-SW (for example, an FC-SW in which the FC switches 102 and 104 in FIG. 1 are located), an FC switch (for example, the FC switch 104 in FIG. 1) in the FC-SW allocates an FC identifier to the N port of the remote node, where the FC identifier is the first N_port ID. The FC switch in the FC-SW is triggered to send, by using an F port (for example, the F port 116 in FIG. 1) of the FC switch, an RSCN carrying the first N_port ID. The FC switch may send multiple RSCNs to the NPV switch, and first N_port IDs carried by these RSCNs are the same. Further, the FC switch may also send multiple RSCNs to the NPV switch by using multiple F ports of the FC switch, and first N_port IDs carried by these RSCNs are the same. In this embodiment of the present disclosure, the RSCN carrying the first N_port ID is referred to as a first RSCN. After perceiving joining of the remote node, another FC switch (for example, the FC switch 102 in FIG. 1) in the FC-SW sends, by using an F port (for example, the F port 114 in FIG. 1) of the another FC switch, the first RSCN carrying the first N_port ID.

The NPV switch receives the first RSCNs by using the multiple N ports of the at least two N ports. The NPV switch receives the first RSCNs only by using the ports of the at least two ports connected to the FC-SW.

Before step 502, a node connected to the NPV switch is virtualized as a VN_port by the NPV switch, and a process is as follows First, the NPV switch receives a first FLOGI request by using an F port (for example, the F port 120 in FIG. 1) of the NPV switch, where the first FLOGI request includes a first WWPN; or the NPV switch receives a first FDISC request by using an F port (for example, the F port 120 in FIG. 1) of the NPV switch, where the first FDISC request includes a first WWPN.

The first WWPN is a WWPN of an N_port (for example, the N port 130 in FIG. 1) or a VN_port that is of the node (for example, the node 110 in FIG. 1) and that is connected to the NPV switch.

Then, the NPV switch sends a second FDISC request by using one N port (for example, the N port 126 in FIG. 1) of the at least two N ports connected to the FC-SW, where the second FDISC request includes the first WWPN.

The NPV switch may select, according to a load sharing rule, a network topology, a link status, a QOS policy, or any combination thereof, one N port from the at least two N ports to send the second FDISC request. The selected N port may be referred to as an N port for which the node is registered.

After an FC switch (for example, the FC switch 104 in FIG. 1) connected to the selected N port receives the second FDISC request, the FC switch allocates a corresponding N_port ID, that is, a third N_port ID, to the first WWPN included in the second FDISC request. The FC switch returns a second FDISC response including the third N_port ID to the NPV switch.

Finally, the NPV switch receives a second FDISC response by using the N port that sends the second FDISC request, where the second FDISC response includes the third N_port ID corresponding to the first WWPN. The NPV switch records a correspondence between the third N_port ID and the N_port that receives the second FDISC response.

The NPV switch returns a first FLOGI response to the node, or the NPV switch returns a first FDISC response to the node. In a situation in which the NPV switch receives the first FLOGI request, the NPV switch returns the first FLOGI response to the node. In a situation in which the NPV switch receives the first FDISC request, the NPV switch returns the first FDISC response to the node.

Optionally, the NPV switch returns a first FLOGI response including the third N_port ID or a first FDISC response including the third N_port ID to the node.

Optionally, the NPV switch allocates a fourth N_port ID to the first WWPN, establishes a correspondence between the third N_port ID and the fourth N_port ID, and returns a first FLOGI response including the fourth N_port ID or a first FDISC response including the fourth N_port ID to the node. The solution is a common transparent router solution. In a situation in which the solution is used, the step of allocating the fourth N_port ID to the first WWPN and returning the first FLOGI response or the first FDISC response of the fourth N_port ID and the step of sending the second FDISC request may be performed at the same time. After the third N_port ID is acquired, the NPV switch records the correspondence between the third N_port ID and the N_port that receives the second FDISC response. Further, the NPV switch records the correspondence between the third N_port ID and the fourth N_port ID.

504: The NPV switch allocates, to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications.

The NPV switch allocates one N_port ID to each of the multiple N_ports that receive the first RSCNs. The N_port ID is a virtual N_port ID that is of the N port of the remote node and that is for the N_port of the NPV switch, rather than an N_port ID of the N_port of the NPV switch. Although values of these N_port IDs are different, they are collectively referred to as the second N_port ID in this embodiment of the present disclosure. Generally, any second N_port ID is different from the first N_port ID; however, a possibility that one second N_port ID is the same as the first N_port ID is not ruled out.

There is a bijection relationship between all the second N_port IDs corresponding to one first N_port ID and the multiple N_ports that receive the first RSCNs. That is, in a situation in which one first N_port ID and one N_port of the multiple N_ports are determined, one and only one second N_port ID can be found to correspond to the first N_port ID and the N_port; and in a situation in which one second N_port ID is determined, one and only one N_port can be found to correspond to the second N_port ID. The NPV switch records a correspondence between all the second N_port IDs corresponding to the first N_port ID and the multiple N_ports.

The multiple first RSCNs that carry the same first N_port ID and that are received by the NPV switch may not be received at the same time, and the NPV switch allocates, under the trigger of each first RSCN, the second N_port IDs to the N_ports that receive the first RSCNs. The NPV switch allocates, to the N_ports that receive the first RSCNs, second N_port IDs that are different from the second N_port IDs that have been allocated by the NPV switch and that are corresponding to the first N_port ID.

One N_port of the NPV switch may receive multiple first RSCNs, and the NPV switch is triggered only by a first RSCN that carries the same first N_port ID and that is received by the NPV switch by using the same N_port, so as to allocate a second N_port ID to the N_port. Generally, the NPV switch does not change, under the trigger of multiple first RSCNs that carry a same first N_port ID and that are received by using a same N_port, a second N_port ID that has been allocated to one N_port of the NPV switch.

506: The NPV switch sends a second registered state change notification by using an F port of the NPV switch, where the second registered state change notification carries one of the multiple second N port identifiers.

The NPV switch sends, by using the second RSCN, the N_port ID of the remote node to the node (for example, the node 110 in FIG. 1) that is connected to the NPV switch. To enable nodes registered for different N_ports of the NPV switch to communicate with the remote node at the same time, the NPV switch virtualizes the remote node as multiple different remote nodes, that is, remote nodes whose N_port IDs are the different second N_port IDs. For an N_port on the NPV switch, the NPV switch sends, by using the second RSCN and according to the correspondence that is between the third N_port ID and the N_port of the NPV switch and that is recorded by the NPV switch, the second N_port ID to all nodes corresponding to the third N_port ID corresponding to the N_port, that is, sends, by using the second RSCN, the second N_port ID to all nodes registered for the N_port. For example, a destination FC ID of the second RSCN is the third N_port ID, and the second RSCN carries the second N_port ID. For another example, in the transparent router solution, a destination FC ID of the second RSCN is the fourth N_port ID corresponding to the third N_port ID, and the second RSCN carries the second N_port ID. Generally, a quantity of second RSCNs sent by the NPV switch is equal to a quantity of nodes registered for the N_port. The NPV switch sends, for the N port that receives the first RSCN, a second RSCN to all nodes registered for the N_port, that is, sends the second RSCN under the trigger of the first RSCN.

Because second N_port IDs are allocated, to remote nodes, for the multiple N_ports of the NPV switch, regardless of which N_port of these N_ports a node connected to the NPV switch is registered for, the node can obtain the second N_port IDs that are of the remote node and that are corresponding to the N_port. Therefore, any node connected to the NPV switch can communicate with any remote node, thereby improving communication efficiency. A communication process is described as follows: When communicating with a remote node, a node connected to the NPV switch sends an FC packet to the remote node. The NPV switch receives the FC packet by using the F port of the NPV switch, where a destination FC ID of the FC packet is a second N_port ID. The NPV switch replaces the destination FC ID of the FC packet with a first N_port ID corresponding to the second N_port ID. Because there is a bijection relationship between all the second N_port IDs corresponding to one first N_port ID and the multiple N_ports that receive the first RSCNs, the NPV switch may find, according to a second N_port ID, a unique N_port that is corresponding to the second N_port ID, to send the replaced FC packet. In the transparent router solution, a source FC ID of the FC packet is the fourth N_port ID. In the transparent router solution, further, the NPV switch replaces the source FC ID of the FC packet with the third N_port ID according to the correspondence between the third N_port ID and the fourth N_port ID. The NPV switch sends the replaced FC packet by using an N_port corresponding to the second N_port ID.

When communicating with a node connected to the NPV switch, a remote node sends an FC packet to the node connected to the NPV switch. The NPV switch receives the FC packet by using one N port of the at least two N ports connected to the FC-SW, where a source FC ID of the FC packet is a first N_port ID. The NPV switch replaces the source FC ID of the FC packet with a second N_port ID that is of the multiple second N_port IDs corresponding to the first N_port ID and that is corresponding to the N port that receives the FC packet. Because there is a bijection relationship between all the second N_port IDs corresponding to one first N_port ID and the multiple N_ports that receive the first RSCNs, the NPV switch may find, according to the first N_port ID and the N port that receives the FC packet, a unique second N_port ID corresponding to the first N_port ID. A destination FC ID of the FC packet is the third N_port ID. In the transparent router solution, further, the NPV switch replaces the destination FC ID of the FC packet with the fourth N_port ID according to the correspondence between the third N_port ID and the fourth N_port ID. The NPV switch sends the replaced FC packet; the NPV switch sends the replaced FC packet by using the F_port.

Figure 6:
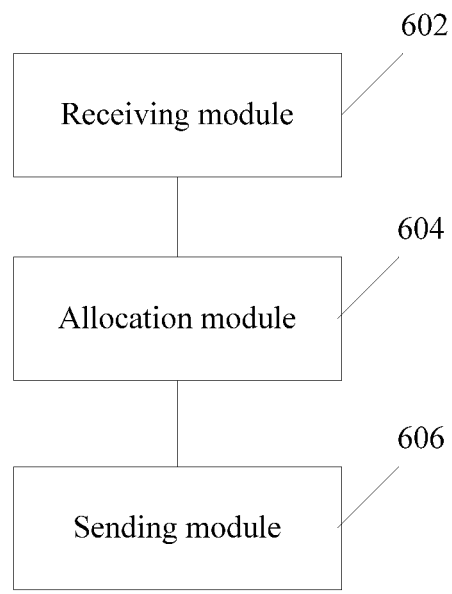
FIG. 6 is a structural diagram of an apparatus for implementing node port virtualization on a fibre channel according to an embodiment of the present disclosure.

Referring to FIG. 1 and FIG. 6, an embodiment of the present disclosure provides an apparatus for implementing node port virtualization on a fibre channel, where the apparatus for implementing NPV is implemented by a NPV switch, and the NPV switch is connected to a fibre channel switched fabric by using at least two N ports. The FC-SW is a switched fabric that is accessed by the NPV switch. FIG. 6 is a structural diagram of the apparatus for implementing NPV on a fibre channel according to this embodiment of the present disclosure. The apparatus is similar to the apparatus provided by the embodiment shown in FIG. 3, and a difference lies in that: instead of allocating a second N_port ID to each of all the N ports of the NPV switch connected to the FC-SW, the apparatus allocates a second N_port ID to each N port that receive a first RSCN. The apparatus includes a receiving module 602, an allocation module 604, and a sending module 606.

The receiving module 602 is configured to receive multiple first registered state change notifications by using multiple N ports of the at least two N ports, where the multiple first registered state change notifications carry a same first N port identifier.

Generally, each N port is corresponding to one physical port of the NPV switch.

In the FC protocol, an RSCN is a notification that is of the FC switched fabric and that is sent to a node in a situation in which any major change occurs in the switched fabric. Some events triggering the RSCN are that: a node joins or leaves the switched fabric; a switch joins or leaves the switched fabric; and a name of a switch changes.

The first N_port ID is an FC ID of an N port (for example, the N port 128 in FIG. 1) of a remote node (for example, the remote node 108 in FIG. 1). In a process in which the remote node joins an FC-SW (for example, an FC-SW in which the FC switches 102 and 104 in FIG. 1 are located), an FC switch (for example, the FC switch 104 in FIG. 1) in the FC-SW allocates an FC identifier to the N port of the remote node, where the FC identifier is the first N_port ID. The FC switch in the FC-SW is triggered to send, by using an F port (for example, the F port 116 in FIG. 1) of the FC switch, an RSCN carrying the first N_port ID. The FC switch may send multiple RSCNs to the NPV switch, and first N_port IDs carried by these RSCNs are the same. Further, the FC switch may also send multiple RSCNs to the NPV switch by using multiple F ports of the FC switch, and first N_port IDs carried by these RSCNs are the same. In this embodiment of the present disclosure, the RSCN carrying the first N_port ID is referred to as a first RSCN. After perceiving joining of the remote node, another FC switch (for example, the FC switch 102 in FIG. 1) in the FC-SW sends, by using an F port (for example, the F port 114 in FIG. 1) of the another FC switch, the first RSCN carrying the first N_port ID.

The receiving module of the apparatus for NPV receives the first RSCNs by using the multiple N ports of the at least two N ports, where the apparatus is implemented by the NPV switch. The receiving module receives the first RSCNs only by using the ports of the at least two ports connected to the FC-SW.

The apparatus for NPV further includes a first virtual module, a second virtual module, or a combination thereof, where the apparatus is implemented by the NPV switch. Before the receiving module receives the first RSCNs, a node connected to the NPV switch is virtualized as a VN_port by the NPV switch, and the process is executed by the first virtual module, the second virtual module, or the combination thereof.

The first virtual module is configured to receive a first FLOGI request by using an F port (for example, the F port 120 in FIG. 1) of the NPV switch, where the first FLOGI request includes a first WWPN; send a second FDISC request by using one N port (for example, the N port 126 in FIG. 1) of the at least two N ports connected to the FC-SW, where the second FDISC request includes the first WWPN; and receive a second FDISC response by using the N port that sends the second FDISC request, where the second FDISC response includes a third N_port ID corresponding to the first WWPN.

The second virtual module is configured to receive a first FDISC request by using the F port (for example, the F port 120 in FIG. 1) of the NPV switch, where the first FDISC request includes the first WWPN; send a second FDISC request by using one N port (for example, the N port 126 in FIG. 1) of the at least two N ports connected to the FC-SW, where the second FDISC request includes the first WWPN; and receive a second FDISC response by using the N port that sends the second FDISC request, where the second FDISC response includes the third N_port ID corresponding to the first WWPN.

The apparatus for NPV records a correspondence between the third N_port ID and the N_port that receives the second FDISC response.

The first WWPN is a WWPN of an N_port (for example, the N port 130 in FIG. 1) or a VN_port that is of the node (for example, the node 110 in FIG. 1) and that is connected to the NPV switch.

The first virtual module, the second virtual module, or the combination thereof may select, according to a load sharing rule, a network topology, a link status, a QOS policy, or any combination thereof, one N port from the at least two N ports to send the second FDISC request. The selected N port may be referred to as an N port for which the node is registered.

After an FC switch (for example, the FC switch 104 in FIG. 1) connected to the selected N port receives the second FDISC request, the FC switch allocates a corresponding N_port ID, that is, the third N_port ID, to the first WWPN included in the second FDISC request. The FC switch returns the second FDISC response including the third N_port ID to the NPV switch.

The first virtual module is further configured to return a first FLOGI response to the node. The second virtual module is further configured to return a first FDISC response to the node.

Optionally, the first virtual module returns the first FLOGI response including the third N_port ID to the node. Optionally, the second virtual module returns the first FDISC response including the third N_port ID to the node.

Optionally, the first virtual module allocates a fourth N_port ID to the first WWPN, establishes a correspondence between the third N_port ID and the fourth N_port ID, and returns a first FLOGI response including the fourth N_port ID to the node. Optionally, the second virtual module allocates a fourth N_port ID to the first WWPN, establishes a correspondence between the third N_port ID and the fourth N_port ID, and returns a first FDISC response including the fourth N_port ID to the node. The solution is a common transparent router solution. In a situation in which the solution is used, the first virtual module and the second virtual module may perform the step of allocating the fourth N_port ID to the first WWPN and returning the first FLOGI response or the first FDISC response of the fourth N_port ID and the step of sending the second FDISC request at the same time. After the third N_port ID is acquired, the apparatus for NPV records the correspondence between the third N_port ID and the N_port that receives the second FDISC response. Further, the apparatus for NPV records the correspondence between the third N_port ID and the fourth N_port ID.

The allocation module 604 is configured to allocate, to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications.

The allocation module 604 allocates one N_port ID to each of the multiple N_ports that receive the first RSCNs. The N_port ID is a virtual N_port ID that is of the N port of the remote node and that is for the N_port of the NPV switch, rather than an N_port ID of the N_port of the NPV switch. Although values of these N_port IDs are different, they are collectively referred to as the second N_port ID in this embodiment of the present disclosure. Generally, any second N_port ID is different from the first N_port ID; however, a possibility that one second N_port ID is the same as the first N_port ID is not ruled out.

There is a bijection relationship between all the second N_port IDs corresponding to one first N_port ID and the multiple N_ports that receive the first RSCNs. That is, in a situation in which one first N_port ID and one N_port of the multiple N_ports are determined, one and only one second N_port ID can be found to correspond to the first N_port ID and the N_port; and in a situation in which one second N_port ID is determined, one and only one N_port can be found to correspond to the second N_port ID. The NPV switch records a correspondence between all the second N_port IDs corresponding to the first N_port ID and the multiple N_ports connected to the FC-SW.

The multiple first RSCNs that carry the same first N_port ID and that are received by the receiving module 602 may not be received at the same time, and the allocation module 604 allocates, under the trigger of each first RSCN, the second N_port IDs to the N_ports that receive the first RSCNs. The allocation module 604 allocates, to the N_ports that receive the first RSCNs, second N_port IDs that are different from the second N_port IDs that have been allocated by the allocation module 604 and that are corresponding to the first N_port ID.

The receiving module 602 may receive multiple first RSCNs by using one N_port of the NPV switch, and the allocation module 604 is triggered only by a first RSCN that carries the same first N_port ID and that is received by the receiving module 602 by using the same N_port, so as to allocate a second N_port ID to the N_port. Generally, the allocation module 604 does not change, under the trigger of multiple first RSCNs that carry a same first N_port ID and that are received by the receiving module 602 by using a same N_port, a second N_port ID that has been allocated to one N_port of the NPV switch.

The sending module 606 is configured to send a second registered state change notification by using the F port of the NPV switch, where the second registered state change notification carries one of the multiple second N port identifiers.

The sending module 606 sends, by using the second RSCN, the N_port ID of the remote node to the node (for example, the node 110 in FIG. 1) that is connected to the NPV switch. To enable nodes registered for different N_ports of the NPV switch to communicate with the remote node at the same time, the apparatus for implementing NPV virtualizes the remote node as multiple different remote nodes, that is, remote nodes whose N_port IDs are the different second N_port IDs. For an N_port on the NPV switch, the apparatus for implementing NPV sends, by using the second RSCN and according to the correspondence that is between the third N_port ID and the N_port of the NPV switch and that is recorded by the apparatus for implementing NPV, the second N_port ID to all nodes corresponding to the third N_port ID corresponding to the N_port, that is, sends, by using the second RSCN, the second N_port ID to all nodes registered for the N_port. For example, a destination FC ID of the second RSCN is the third N_port ID, and the second RSCN carries the second N_port ID. For another example, in the transparent router solution, a destination FC ID of the second RSCN is the fourth N_port ID corresponding to the third N_port ID, and the second RSCN carries the second N_port ID. Generally, a quantity of second RSCNs sent by the sending module 606 is equal to a quantity of nodes registered for the N_port. The sending module 606 sends, for the N port that receives the first RSCN, a second RSCN to all nodes registered for the N_port, that is, sends the second RSCN under the trigger of the first RSCN.

Because second N_port IDs are allocated, to remote nodes, for the multiple N_ports of the NPV switch, regardless of which N_port of these N_ports a node connected to the NPV switch is registered for, the node can obtain the second N_port IDs that are of the remote node and that are corresponding to the N_port. Therefore, any node connected to the NPV switch can communicate with any remote node, thereby improving communication efficiency. A communication process is described as follows: When communicating with a remote node, a node connected to the NPV switch sends an FC packet to the remote node. The receiving module 602 is further configured to receive the FC packet by using the F port of the NPV switch, where a destination FC ID of the FC packet is a second N_port ID. The sending module 606 is further configured to replace the destination FC ID of the FC packet with a first N_port ID corresponding to the second N_port ID. Because there is a bijection relationship between all the second N_port IDs corresponding to one first N_port ID and the multiple N_ports that receive the first RSCNs, the sending module 606 may find, according to a second N_port ID, a unique N_port that is corresponding to the second N_port ID, to send the replaced FC packet. In the transparent router solution, a source FC ID of the FC packet is the fourth N_port ID. In the transparent router solution, further, the sending module 606 is further configured to replace the source FC ID of the FC packet with the third N_port ID according to the correspondence between the third N_port ID and the fourth N_port ID. The sending module 606 is further configured to send the replaced FC packet by using an N_port corresponding to the second N_port ID.

When communicating with a node connected to the NPV switch, a remote node sends an FC packet to the node connected to the NPV switch. The receiving module 602 is further configured to receive the FC packet by using one N port of the at least two N ports connected to the FC-SW, where a source FC ID of the FC packet is a first N_port ID. The sending module 606 is further configured to replace the source FC ID of the FC packet with a second N_port ID that is of the multiple second N_port IDs corresponding to the first N_port ID and that is corresponding to the N port that receives the FC packet. Because there is a bijection relationship between all the second N_port IDs corresponding to one first N_port ID and the multiple N_ports that receive the first RSCNs, the sending module 606 may find, according to the first N_port ID and the N port that receives the FC packet, a unique second N_port ID corresponding to the first N_port ID. A destination FC ID of the FC packet is the third N_port ID. In the transparent router solution, further, the sending module 606 is further configured to replace the destination FC ID of the FC packet with the fourth N_port ID according to the correspondence between the third N_port ID and the fourth N_port ID. The sending module 606 is further configured to send the replaced FC packet; the NPV switch sends the replaced FC packet by using the F_port.

Figure 7:
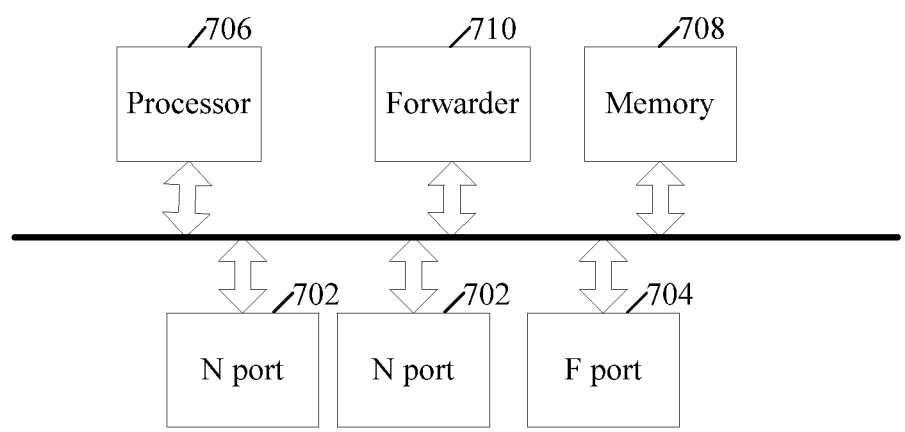
FIG. 7 is a structural diagram of an NPV switch according to an embodiment of the present disclosure.

Referring to FIG. 1 and FIG. 7, an embodiment of the present disclosure provides a NPV switch. The NPV switch refers to a fibre channel switch working in NPV mode, which is hereinafter referred to as an NPV switch for short. FIG. 7 is a structural diagram of the NPV switch according to this embodiment of the present disclosure. The NPV switch includes at least two N ports 702, an F port 704, a processor 706, and a memory 708. The at least two N ports 702 are connected to an FC-SW. The FC-SW is a switched fabric that is accessed by the NPV switch. The at least two N ports 702 may be physically implemented by an optical transceiver or an electrical transceiver. The F port 704 may be physically implemented by an optical transceiver or an electrical transceiver. For example, the optical transceiver may be an SFP transceiver, an SFP+ transceiver, or an XFP transceiver. The electrical transceiver may be . . . . The processor 706 may be a CPU. The memory 708 may be a volatile memory, for example, a RAM, or a non-volatile memory, for example, a ROM, a flash memory, a hard disk, or a solid-state disk. The at least two N ports 702, the F port 704, and the memory 708 are all connected to the processor 706. A bold line in FIG. 7 is a bus. The NPV switch has a same physical structure as the NPV switch provided by the embodiment shown in FIG. 4, and a difference lies in that: instead of allocating a second N_port ID to each of all the N ports connected to the FC-SW, the processor 706 of the NPV switch allocates a second N_port ID to each N port that receive a first RSCN. The processor 706 executes, according to a program instruction stored in the memory 708, some operation steps in the embodiment shown in FIG. 5.

First, the processor 706 receives multiple first registered state change notifications by using multiple N ports of the at least two N ports 702, where the multiple first registered state change notifications carry a same first N port identifier.

In the Fibre Channel protocol, an RSCN is a notification that is of the FC switched fabric and that is sent to a node in a situation in which any major change occurs in the switched fabric. Some events triggering the RSCN are that: a node joins or leaves the switched fabric; a switch joins or leaves the switched fabric; and a name of a switch changes.

The first N_port ID is an FC ID of an N port (for example, the N port 128 in FIG. 1) of a remote node (for example, the remote node 108 in FIG. 1). In a process in which the remote node joins an FC-SW (for example, an FC-SW in which the FC switches 102 and 104 in FIG. 1 are located), an FC switch (for example, the FC switch 104 in FIG. 1) in the FC-SW allocates an FC identifier to the N port of the remote node, where the FC identifier is the first N_port ID. The FC switch in the FC-SW is triggered to send, by using an F port (for example, the F port 116 in FIG. 1) of the FC switch, an RSCN carrying the first N_port ID. The FC switch may send multiple RSCNs to the NPV switch, and first N_port IDs carried by these RSCNs are the same. Further, the FC switch may also send multiple RSCNs to the NPV switch by using multiple F ports of the FC switch, and first N_port IDs carried by these RSCNs are the same. In this embodiment of the present disclosure, the RSCN carrying the first N_port ID is referred to as a first RSCN. After perceiving joining of the remote node, another FC switch (for example, the FC switch 102 in FIG. 1) in the FC-SW sends, by using an F port (for example, the F port 114 in FIG. 1) of the another FC switch, the first RSCN carrying the first N_port ID.

The processor 706 of the NPV switch receives the first RSCNs by using the multiple N ports of the at least two N ports 702. The processor 706 of the NPV switch receives the first RSCNs only by using the ports of the at least two ports connected to the FC-SW.

Before the first RSCNs are received, a node connected to the NPV switch is virtualized as a VN_port by the NPV switch, and a process is as follows Step 1: The processor 706 of the NPV switch receives a first FLOGI request by using the F port 704 (for example, the F port 120 in FIG. 1) of the NPV switch, where the first FLOGI request includes a first WWPN, or the processor 706 of the NPV switch receives a first FDISC request by using the F port 704 (for example, the F port 120 in FIG. 1) of the NPV switch, where the first FDISC request includes a first WWPN.

The first WWPN is a WWPN of an N_port (for example, the N port 130 in FIG. 1) or a VN_port that is of the node (for example, the node 110 in FIG. 1) and that is connected to the NPV switch.

Step 2: The processor 706 of the NPV switch sends a second FDISC request by using one N port (for example, the N port 126 in FIG. 1) of the at least two N ports 702 connected to the FC-SW, where the second FDISC request includes the first WWPN.

The processor 706 of the NPV switch may select, according to a load sharing rule, a network topology, a link status, a QOS policy, or any combination thereof, one N port from the at least two N ports 702 to send the second FDISC request. The selected N port may be referred to as an N port for which the node is registered.

After an FC switch (for example, the FC switch 104 in FIG. 1) connected to the selected N port receives the second FDISC request, the FC switch allocates a corresponding N_port ID, that is, a third N_port ID, to the first WWPN included in the second FDISC request. The FC switch returns a second FDISC response including the third N_port ID to the NPV switch.

Step 3: The processor 706 of the NPV switch receives a second FDISC response by using the N port that sends the second FDISC request, where the second FDISC response includes the third N_port ID corresponding to the first WWPN. The processor 706 of the NPV switch records, in the memory 708, a correspondence between the third N_port ID and the N_port that receives the second FDISC response.

The processor 706 of the NPV switch returns a first FLOGI response to the node, or the processor 706 of the NPV switch returns a first FDISC response to the node. In a situation in which the first FLOGI request is received, the processor 706 returns the first FLOGI response to the node. In a situation in which the first FDISC request is received, the processor 706 returns the first FDISC response to the node.

Optionally, the processor 706 of the NPV switch returns a first FLOGI response including the third N_port ID or a first FDISC response including the third N_port ID to the node.

Optionally, the processor 706 of the NPV switch allocates a fourth N_port ID to the first WWPN, establishes a correspondence between the third N_port ID and the fourth N_port ID, and returns a first FLOGI response including the fourth N_port ID or a first FDISC response including the fourth N_port ID to the node. The solution is a common transparent router solution. In a situation in which the solution is used, the step of allocating the fourth N_port ID to the first WWPN and returning the first FLOGI response or the first FDISC response of the fourth N_port ID and the step of sending the second FDISC request may be performed by the processor 706 at the same time. After the third N_port ID is acquired, the processor 706 of the NPV switch records, in the memory 708, the correspondence between the third N_port ID and the N_port that receives the second FDISC response. Further, the processor 706 of the NPV switch records, in the memory 708, the correspondence between the third N_port ID and the fourth N_port ID.

Then, the processor 706 allocates, to the multiple N ports that receive the multiple first registered state change notifications, multiple second N port identifiers corresponding to the first N port identifier, where the multiple second N port identifiers corresponding to the same first N port identifier are different, and there is a bijection relationship between the multiple second N port identifiers corresponding to the same first N port identifier and the multiple N ports that receive the multiple first registered state change notifications.

The processor 706 allocates one N_port ID to each of the multiple N_ports that receive the first RSCNs. The N_port ID is a virtual N_port ID that is of the N port of the remote node and that is for the N_port of the NPV switch, rather than an N_port ID of the N_port of the NPV switch. Although values of these N_port IDs are different, they are collectively referred to as the second N_port ID in this embodiment of the present disclosure. Generally, any second N_port ID is different from the first N_port ID; however, a possibility that one second N_port ID is the same as the first N_port ID is not ruled out.

There is a bijection relationship between all the second N_port IDs corresponding to one first N_port ID and the multiple N_ports that receive the first RSCNs. That is, in a situation in which one first N_port ID and one N_port of the multiple N_ports are determined, one and only one second N_port ID can be found to correspond to the first N_port ID and the N_port; and in a situation in which one second N_port ID is determined, one and only one N_port can be found to correspond to the second N_port ID. The processor 706 records, in the memory 708, a correspondence between all the second N_port IDs corresponding to the first N_port ID and the multiple N_ports.

The multiple first RSCNs that carry the same first N_port ID and that are received by the NPV switch may not be received at the same time, and the processor 706 of the NPV switch allocates, under the trigger of each first RSCN, the second N_port IDs to the N_ports that receive the first RSCNs. The processor 706 of the NPV switch allocates, to the N_ports that receive the first RSCNs, second N_port IDs that are different from the second N_port IDs that have been allocated by the processor 706 and that are corresponding to the first N_port ID.

One N_port of the NPV switch may receive multiple first RSCNs, and the processor 706 of the NPV switch is triggered only by a first RSCN that carries the same first N_port ID and that is received by the processor 706 by using the same N_port, so as to allocate a second N_port ID to the N_port. Generally, the processor 706 of the NPV switch does not change, under the trigger of multiple first RSCNs that carry a same first N_port ID and that are received by using a same N_port, a second N_port ID that has been allocated to one N_port of the NPV switch.

Finally, the processor 706 sends a second registered state change notification by using the F port 704 of the NPV switch, where the second registered state change notification carries one of the multiple second N port identifiers.

The processor 706 sends, by using the second RSCN, the N_port ID of the remote node to the node (for example, the node 110 in FIG. 1) that is connected to the NPV switch. To enable nodes registered for different N_ports of the NPV switch to communicate with the remote node at the same time, the NPV switch virtualizes the remote node as multiple different remote nodes, that is, remote nodes whose N_port IDs are the different second N_port IDs. For an N_port on the NPV switch, the processor 706 sends, by using the second RSCN and according to the correspondence that is between the third N_port ID and the N_port of the NPV switch and that is recorded by the processor 406 in the memory 708, the second N_port ID to all nodes corresponding to the third N_port ID corresponding to the N_port, that is, sends, by using the second RSCN, the second N_port ID to all nodes registered for the N_port. For example, a destination FC ID of the second RSCN is the third N_port ID, and the second RSCN carries the second N_port ID. For another example, in the transparent router solution, a destination FC ID of the second RSCN is the fourth N_port ID corresponding to the third N_port ID, and the second RSCN carries the second N_port ID. Generally, a quantity of second RSCNs sent by the NPV switch is equal to a quantity of nodes registered for the N_port. The processor 706 of the NPV switch sends, for the N port that receives the first RSCN, a second RSCN to all nodes registered for the N_port, that is, sends the second RSCN under the trigger of the first RSCN.

Because second N_port IDs are allocated, to remote nodes, for the multiple N_ports of the NPV switch, regardless of which N_port of these N_ports a node connected to the NPV switch is registered for, the node can obtain the second N_port IDs that are of the remote node and that are corresponding to the N_port. Therefore, any node connected to the NPV switch can communicate with any remote node, thereby improving communication efficiency.

The NPV switch further includes a forwarder 710, where the forwarder 710 is configured to forward an FC packet. The forwarder may be an ASIC, an FPGA, or an NP. The forwarder 710 is connected to the at least two N ports 702, the F port 704, and the memory 708 by using the bus.

When communicating with a remote node, a node connected to the NPV switch sends an FC packet to the remote node. The forwarder 710 of the NPV switch receives the FC packet by using the F port 704 of the NPV switch, where a destination FC ID of the FC packet is a second N_port ID. The forwarder 710 of the NPV switch replaces the destination FC ID of the FC packet with a first N_port ID corresponding to the second N_port ID. Because there is a bijection relationship between all the second N_port IDs corresponding to one first N_port ID and the multiple N_ports that receive the first RSCNs, the forwarder 710 of the NPV switch may find, according to a second N_port ID, a unique N_port that is corresponding to the second N_port ID, to send the replaced FC packet. In the transparent router solution, a source FC ID of the FC packet is the fourth N_port ID. In the transparent router solution, further, the forwarder 710 of the NPV switch replaces the source FC ID of the FC packet with the third N_port ID according to the correspondence between the third N_port ID and the fourth N_port ID. The forwarder 710 of the NPV switch sends the replaced FC packet by using an N_port corresponding to the second N_port ID.

When communicating with a node connected to the NPV switch, a remote node sends an FC packet to the node connected to the NPV switch. The forwarder 710 of the NPV switch receives the FC packet by using an N port of the at least two N ports 702 connected to the FC-SW, where a source FC ID of the FC packet is a first N_port ID. The forwarder 710 of the NPV switch replaces the source FC ID of the FC packet with a second N_port ID that is of the multiple second N_port IDs corresponding to the first N_port ID and that is corresponding to the N port that receives the FC packet. Because there is a bijection relationship between all the second N_port IDs corresponding to one first N_port ID and the multiple N_ports that receive the first RSCNs, the forwarder 710 of the NPV switch may find, according to the first N_port ID and the N port that receives the FC packet, a unique second N_port ID corresponding to the first N_port ID. A destination FC ID of the FC packet is the third N_port ID. In the transparent router solution, further, the forwarder 710 of the NPV switch replaces the destination FC ID of the FC packet with the fourth N_port ID according to the correspondence between the third N_port ID and the fourth N_port ID. The NPV switch sends the replaced FC packet; the NPV switch sends the replaced FC packet by using the F_port.

The correspondence used by the forwarder 710 for replacing and forwarding the FC packet may be acquired from the memory 708 by the forwarder 710 after the FC packet is received. Alternatively, the forwarder 710 may periodically acquire, from the memory 708, the correspondence that is required for replacing and forwarding the FC packet, and save the correspondence in a memory in the forwarder 710; or when the correspondence changes, the processor 706 may save, in a memory in the forwarder 710, the correspondence that is required for replacing and forwarding the FC packet. A manner of periodically acquiring a correspondence and a manner of acquiring a correspondence when the correspondence changes may coexist.

The technical solutions provided by the embodiments shown in FIG. 2 to FIG. 4 and the technical solutions provided by the embodiments shown in FIG. 5 to FIG. 7 belong to a general disclosure concept, both of which are intended to allocate, corresponding to one first N_port ID, multiple different second N_port IDs to multiple N ports, and a difference only lies in a trigger condition of allocating the second N_port IDs. In the technical solutions provided by the embodiments shown in FIG. 2 to FIG. 4, an NPV switch is triggered by a first RSCN that carries a same first N_port ID and that is received by the NPV switch, to perform an action of allocating a second N_port ID to all N_ports connected to an FC-SW. In the technical solutions provided by the embodiments shown in FIG. 5 to FIG. 7, an NPV switch is triggered by each first RSCN to allocate a second N_port ID to N_ports that receive the first RSCNs. In the technical solutions provided by the embodiments shown in FIG. 2 to FIG. 4, allocation of the second N_port IDs is simple without the need to learn which second N_port IDs have been allocated corresponding to the first N_port ID. In technical solutions provided by the embodiments shown in FIG. 5 to FIG. 7, a process of acquiring the N_ports to which the second N_port IDs need to be allocated, which does not need to pre-configure information about which N_ports are connected to an FC-SW, or does not need to determine which N_ports are connected to an FC-SW in an extra automatic discovery manner either.

A person of ordinary skill in the art may understand that all or a part of the steps of the method embodiments may be implemented by a program instructing relevant hardware. The program may be stored in a computer readable storage medium. The storage medium may be a random access memory, a read-only memory, a flash memory, a hard disk, a solid-state disk, or an optical disc.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for implementing node port virtualization on a fibre channel, wherein a node port (N_port) virtualization (NPV) switch is coupled to a fibre channel switched fabric using at least two N_ports, and wherein the method comprises:

receiving, by the NPV switch, a first registered state change notification using an N_port of the at least two N_ports, wherein the first registered state change notification carries a first N_port identifier;

allocating, by the NPV switch to the at least two N_ports coupled to the fibre channel switched fabric, at least two second N_port identifiers corresponding to the first N_port identifier, wherein the at least two second N_port identifiers corresponding to the first N_port identifier are different, and wherein there is a bijection relationship between the at least two second N_port identifiers corresponding to the first N_port identifier and the at least two N_ports coupled to the fibre channel switched fabric;

sending, by the NPV switch, a second registered state change notification using a fabric port (F_port) of the NPV switch, wherein the second registered state change notification carries one of the at least two second N_port identifiers;

receiving, by the NPV switch, a fibre channel packet using the F_port of the NPV switch, wherein a destination fibre channel identifier of the fibre channel packet is one of the at least two second N_port identifiers;

replacing, by the NPV switch, the destination fibre channel identifier of the fibre channel packet with the first N_port identifier corresponding to the at least two second N_port identifiers; and sending, by the NPV switch, the fibre channel packet using one N_port of the at least two N_ports corresponding to the destination fibre channel identifier.

2. The method according to claim 1, further comprising:
receiving, by the NPV switch, a fibre channel packet using one N_port of the at least two N_ports, wherein a source fibre channel identifier of the fibre channel packet is the first N_port identifier;

replacing, by the NPV switch, the source fibre channel identifier of the fibre channel packet with one of the at least two second N_port identifiers corresponding to the first N_port identifier and the N_port that receives the fibre channel packet; and sending, by the NPV switch, the fibre channel packet.

3. The method according to claim 1, wherein before receiving, by the NPV switch, the first registered state change notification using any one of the at least two N_ports, the method further comprises:
receiving, by the NPV switch, a first fabric login request using the F_port of the NPV switch, wherein the first fabric login request comprises a first world wide port name;

sending, by the NPV switch, a second fabric discovery request using one N_port of the at least two N_ports coupled to the fibre channel switched fabric, wherein the second fabric discovery request comprises the first world wide port name; and receiving, by the NPV switch, a second fabric discovery response using the N_port that sends the second fabric discovery request, wherein the second fabric discovery response comprises a third N_port identifier corresponding to the first world wide port name.

4. The method according to claim 1, wherein before receiving, by the NPV switch, the first registered state change notification using any one of the at least two N_ports, the method further comprises:
receiving, by the NPV switch, a first fabric discovery request using the F_port of the NPV switch, wherein the first fabric discovery request comprises a first world wide port name;

sending, by the NPV switch, a second fabric discovery request using one N_port of the at least two N_ports coupled to the fibre channel switched fabric, wherein the second fabric discovery request comprises the first world wide port name; and receiving, by the NPV switch, a second fabric discovery response using the N_port that sends the second fabric discovery request, wherein the second fabric discovery response comprises a third N_port identifier corresponding to the first world wide port name.

5. A node port (N_port) virtualization (NPV) switch, wherein the NPV switch comprises:
at least two N_ports, wherein the at least two N_ports are configured to couple to a fibre channel switched fabric;

a processor, wherein the processor is coupled to the at least two N_ports;

a fabric port (F_port), wherein the F_port is coupled to the processor; and a memory, wherein the memory is coupled to the processor, and wherein the processor executes the following steps according to a program instruction stored by the memory:
receiving a first registered state change notification using an N_port of the at least two N_ports, wherein the first registered state change notification carries a first N_port identifier;

allocating, to the at least two N_ports, at least two second N_port identifiers corresponding to the first N_port identifier, wherein the at least two second N_port identifiers corresponding to the first N_port identifier are different, and wherein there is a bijection relationship between the at least two second N_port identifiers corresponding to the first N_port identifier and the at least two N_ports coupled to the fibre channel switched fabric; and sending a second registered state change notification using the F_port, wherein the second registered state change notification carries one of the at least two second N_port identifiers, wherein the NPV switch further comprises a forwarder coupled to the processor, and wherein the forwarder is configured to:
receive a fibre channel packet using the F_port of the NPV switch, wherein a destination fibre channel identifier of the fibre channel packet is one of the at least two second N_port identifiers;

replace the destination fibre c f the fibre channel packet with the first N_port identifier corresponding to the at least two second N_port identifiers; and send the fibre channel packet using one N_port of the at least two N_ports corresponding to the destination fibre channel identifier.

6. The NPV switch according to claim 5, wherein the forwarder is further configured to:
receive a fibre channel packet using one N_port of the at least two N_ports, wherein a source fibre channel identifier of the fibre channel packet is the first N_port identifier;

replace the source fibre channel identifier of the fibre channel packet with a second N_port identifier of the at least two second N_port identifiers corresponding to the first N_port identifier and the N_port that receives the fibre channel packet; and send the fibre channel packet.

7. The NPV switch according to claim 5, wherein before executing, according to the program instruction stored by the memory, the step of receiving the first registered state change notification using any one of the at least two N_ports, the processor further executes the following steps:
receiving a first fabric login request using the F_port, wherein the first fabric login request comprises a first world wide port name;

sending a second fabric discovery request using one N_port of the at least two N_ports coupled to the fibre channel switched fabric, wherein the second fabric discovery request comprises the first world wide port name; and receiving a second fabric discovery response using the N_port that sends the second fabric discovery request, wherein the second fabric discovery response comprises a third N_port identifier corresponding to the first world wide port name.

8. The NPV switch according to claim 5, wherein before executing, according to the program instruction stored by the memory, the step of receiving the first registered state change notification using any one of the at least two N_ports, the processor further executes the following steps:

receiving a first fabric discovery request using the F_port, wherein the first fabric discovery request comprises a first world wide port name;

sending a second fabric discovery request using one N_port of the at least two N_ports coupled to the fibre channel switched fabric, wherein the second fabric discovery request comprises the first world wide port name; and receiving a second fabric discovery response using the N_port that sends the second fabric discovery request, wherein the second fabric discovery response comprises a third N_port identifier corresponding to the first world wide port name.

9. A method for implementing node port (N_port) virtualization (NPV) on a fibre channel, wherein an NPV switch is coupled to a fibre channel switched fabric using at least two N_ports, and wherein the method comprises:

receiving, by the NPV switch, multiple first registered state change notifications using multiple N_ports of the at least two N_ports, wherein the multiple first registered state change notifications carry a first N_port identifier;

allocating, by the NPV switch to the multiple N_ports that receive the multiple first registered state change notifications, multiple second N_port identifiers corresponding to the first N_port identifier, wherein the multiple second N_port identifiers corresponding to the first N_port identifier are different, and wherein there is a bijection relationship between the multiple second N_port identifiers corresponding to the first N_port identifier and the multiple N_ports that receive the multiple first registered state change notifications;

sending, by the NPV switch, a second registered state change notification using an F_port of the NPV switch, wherein the second registered state change notification carries one of the multiple second N_port identifiers;

receiving, by the NPV switch, a fibre channel packet using one N_port of the at least two N_ports, wherein a source fibre channel identifier of the fibre channel packet is the first N_port identifier;

replacing, by the NPV, the source fibre channel identifier of the fibre channel packet with a second N_port identifier of the multiple second N_port identifiers corresponding to the first N_port identifier and the N_port that receives the fibre channel packet; and sending, by the NPV switch, the fibre channel packet.

10. The method according to claim 9, further comprising:

receiving, by the NPV switch, a fibre channel packet using the F_port of the NPV switch, wherein a destination fibre channel identifier of the fibre channel packet is one of the at least two second N_port identifiers;

replacing, by the NPV switch, the destination fibre channel identifier of the fibre channel packet with the first N_port identifier corresponding to the at least two second N_port identifiers; and sending, by the NPV switch, the fibre channel packet using one N_port of the at least two N_ports corresponding to the destination fibre channel identifier.

11. The method according to claim 9, wherein before receiving, by the NPV switch, the multiple first registered state change notifications using the multiple N_ports of the at least two N_ports, the method further comprises:

receiving, by the NPV switch, a first fabric login request using the F_port of the NPV switch, wherein the first fabric login request comprises a first world wide port name;

sending, by the NPV switch, a second fabric discovery request using one N_port of the at least two N_ports coupled to the fibre channel switched fabric, wherein the second fabric discovery request comprises the first world wide port name; and receiving, by the NPV switch, a second fabric discovery response using the N_port that sends the second fabric discovery request, wherein the second fabric discovery response comprises a third N_port identifier corresponding to the first world wide port name.

12. The method according to claim 9, wherein before receiving, by the NPV switch, the multiple first registered state change notifications using the multiple N_ports of the at least two N_ports, the method further comprises:

receiving, by the NPV switch, a first fabric discovery request using the F_port of the NPV switch, wherein the first fabric discovery request comprises a first world wide port name;

sending, by the NPV switch, a second fabric discovery request using one N_port of the at least two N_ports coupled to the fibre channel switched fabric, wherein the second fabric discovery request comprises the first world wide port name; and receiving, by the NPV switch, a second fabric discovery response using the N_port that sends the second fabric discovery request, wherein the second fabric discovery response comprises a third N_port identifier corresponding to the first world wide port name.

13. A node port (N_port) virtualization (NPV) switch, wherein the NPV switch comprises:

at least two N_ports, wherein the at least two N_ports are configured to couple to a fibre channel switched fabric;

a processor, wherein the processor is coupled to the at least two N_ports;

a fabric port (F_port), wherein the F_port is coupled to the processor; and a memory, wherein the memory is coupled to the processor, and wherein the processor executes the following steps according to a program instruction stored by the memory:

receiving multiple first registered state change notifications using multiple N_ports of the at least two N_ports, wherein the multiple first registered state change notifications carry a first N_port identifier;

allocating, to the multiple N_ports that receive the multiple first registered state change notifications, multiple second N_port identifiers corresponding to the first N_port identifier, wherein the multiple second N_port identifiers corresponding to the first N_port identifier are different, and wherein there is a bijection relationship between the multiple second N_port identifiers corresponding to the first N_port identifier and the multiple N_ports that receive the multiple first registered state change notifications; and sending a second registered state change notification using the F_port, wherein the second registered state change notification carries n f the multiple second N_port identifiers, the NPV switch further comprises a forwarder coupled to the processor, and wherein the forwarder is configured to:
receive a fibre channel packet using one N_port of the at least two N_ports, wherein a source fibre channel identifier of the fibre channel packet is the first N_port identifier;
replace the source fibre channel identifier of the fibre channel packet with a second N_port identifier of the multiple second N_port identifiers corresponding to the first N_port identifier and the N_port that receives the fibre channel packet; and
send the fibre channel packet.

14. The NPV switch according to claim 13, wherein the forwarder is further configured to:
receive a fibre channel packet using the F_port of the NPV switch, wherein a destination fibre channel identifier of the fibre channel packet is one of the at least two second N_port identifiers;
replace the destination fibre channel identifier of the fibre channel packet with the first N_port identifier corresponding to the at least two second N_port identifiers; and
send the fibre channel packet using one N_port of the at least two N_ports corresponding to the destination fibre channel identifier.

15. The NPV switch according to claim 13, wherein before executing, according to the program instruction stored by the memory, the step of receiving the multiple first registered state change notifications using the multiple N_ports of the at least two N_ports, the processor further executes the following steps:
receiving a first fabric login request using the F_port, wherein the first fabric login request comprises a first world wide port name;
sending a second fabric discovery request using one N_port of the at least two N_ports coupled to the fibre channel switched fabric, wherein the second fabric discovery request comprises the first world wide port name; and
receiving a second fabric discovery response using the N_port that sends the second fabric discovery request, wherein the second fabric discovery response comprises a third N_port identifier corresponding to the first world wide port name.

16. The NPV switch according to claim 13, wherein before executing, according to the program instruction stored by the memory, the step of receiving the multiple first registered state change notifications using the multiple N_ports of the at least two N_ports, the processor further executes the following steps:
receiving a first fabric discovery request using the F_port, wherein the first fabric discovery request comprises a first world wide port name;
sending a second fabric discovery request using one N_port of the at least two N_ports coupled to the fibre channel switched fabric, wherein the second fabric discovery request comprises the first world wide port name; and
receiving a second fabric discovery response using the N_port that sends the second fabric discovery request, wherein the second fabric discovery response comprises a third N_port identifier corresponding to the first world wide port name.

* * * * *

UNITED STATES PATENT AND TRADEMARK OFFICE
CERTIFICATE OF CORRECTION

PATENT NO. : 9,729,470 B2  
APPLICATION NO. : 14/827006  
DATED : August 8, 2017  
INVENTOR(S) : Ming Zheng et al.

Page 1 of 1

It is certified that error appears in the above-identified patent and that said Letters Patent is hereby corrected as shown below:

Column 38, Line 37, Claim 5 should read:
replace the destination fibre channel identifier of the fibre channel packet Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*